US012717368B2

(12) United States Patent
Kim et al.

(10) Patent No.: US 12,717,368 B2
(45) Date of Patent: Aug. 25, 2026

(54) REGULATOR, DISPLAY DEVICE INCLUDING THE SAME, ELECTRONIC DEVICE INCLUDING THE SAME, AND METHOD OF DRIVING THE SAME

(71) Applicant: SAMSUNG DISPLAY CO., LTD., Yongin-si (KR)

(72) Inventors: Hyun Chang Kim, Yongin-si (KR); Se Byung Chae, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 149 days.

(21) Appl. No.: 18/526,479

(22) Filed: Dec. 1, 2023

(65) Prior Publication Data

US 2024/0361792 A1 Oct. 31, 2024

(30) Foreign Application Priority Data

Apr. 27, 2023 (KR) ........................ 10-2023-0055803
Jun. 23, 2023 (KR) ........................ 10-2023-0081145

(51) Int. Cl.
*G05F 1/575* (2006.01)
*G09G 3/32* (2016.01)
*G09G 3/3275* (2016.01)

(52) U.S. Cl.
CPC ............... *G05F 1/575* (2013.01); *G09G 3/32* (2013.01); *G09G 3/3275* (2013.01); *G09G 2310/0272* (2013.01); *G09G 2310/0291* (2013.01); *G09G 2310/08* (2013.01)

(58) Field of Classification Search
CPC ........ G05F 1/575; G09G 3/32; G09G 3/3275; G09G 2310/0272; G09G 2310/0291; G09G 2310/08
See application file for complete search history.

(56) References Cited

U.S. PATENT DOCUMENTS

| | | | | |
|---|---|---|---|---|
| 2013/0082910 A1* | 4/2013 | Lee | G09G 3/3208 345/76 |
| 2017/0090497 A1* | 3/2017 | Hamlyn | H03F 3/45179 |
| 2022/0084453 A1* | 3/2022 | Pyun | G09G 3/2003 |
| 2023/0091785 A1* | 3/2023 | Agarwal | G05F 1/59 323/273 |

FOREIGN PATENT DOCUMENTS

KR 10-2023-0043047 3/2023

* cited by examiner

*Primary Examiner* — Kenneth B Lee, Jr.
(74) *Attorney, Agent, or Firm* — F. CHAU & ASSOCIATES, LLC

(57) ABSTRACT

A regulator may include a bias current generation circuit including a first input terminal and a second input terminal and configured to generate a bias current in response to at least one of a voltage applied to the first input terminal and a voltage applied to the second input terminal, and a current source circuit including a plurality of current sources connected in parallel and configured to control a magnitude of the bias current. The regulator, the display device including the same, the electronic device including the same, and the method of driving the same according to embodiments of the disclosure may reduce power consumption.

20 Claims, 21 Drawing Sheets

<Logic level of GW, GB, EM>

<Logic level of GC, GI>

<LUT1>

| | | LCS | | |
|---|---|---|---|---|
| Lum (nit) | 1200 | 1110(2) | 1100(2) | 1110(2) |
| | 650 | 1110(2) | 1010(2) | 1110(2) |
| | 100 | 1010(2) | 1000(2) | 1010(2) |
| | 10 | 1000(2) | 0110(2) | 1000(2) |
| AP | | -25 | 25 | 50 |
| | | Temp (°C) | | |

FIG. 21A

<LUT2a>

| | | LCSa | | |
|---|---|---|---|---|
| Lum (nit) | 1200 | 0011(2) | 0001(2) | 0011(2) |
| | 650 | 0010(2) | 0001(2) | 0010(2) |
| | 100 | 0010(2) | 0001(2) | 0010(2) |
| | 10 | 0001(2) | 0001(2) | 0001(2) |
| BP | | -25 | 25 | 50 |
| | | Temp (°C) | | |

FIG. 21B

<LUT2b>

| | | LCSb | | |
|---|---|---|---|---|
| Lum (nit) | 1200 | 1110(2) | 1100(2) | 1110(2) |
| | 650 | 1110(2) | 1010(2) | 1110(2) |
| | 100 | 1010(2) | 1000(2) | 1010(2) |
| | 10 | 1000(2) | 0110(2) | 1000(2) |
| BP | | -25 | 25 | 50 |
| | | Temp (°C) | | |

REGULATOR, DISPLAY DEVICE INCLUDING THE SAME, ELECTRONIC DEVICE INCLUDING THE SAME, AND METHOD OF DRIVING THE SAME

CROSS REFERENCE TO RELATED APPLICATIONS

This application claims priority to Korean Patent Application No. 10-2023-0055803, filed on, Apr. 27, 2023 and Korean Patent Application No. 10-2023-0081145, filed on, Jun. 23, 2023, and all the benefits accruing therefrom under 35 U.S.C. § 119, the contents of which are herein incorporated by reference in their entireties.

FIELD

Embodiments of the disclosure relate to a regulator, a display device including the same, an electronic device including the same, and a method of driving the same.

DESCRIPTION OF THE RELATED ART

Regulators are employed in a wide variety of electronics applications to generate stable voltages and/or currents as needed. A low-dropout (LDO) regulator is a widely used type of regulator that regulates an output voltage even when a supply voltage is very close to the output voltage. For instance, LDO regulators may be provided within a display device such as a liquid crystal display device (LCD) and an organic light emitting display device to provide stable voltages to a display panel and associated control electronics.

Meanwhile, various studies are being conducted with respect to ways for reducing power consumption of today's display devices.

SUMMARY

Embodiments of the present disclosure relate to a regulator capable of reducing power consumption, a display device including the same, an electronic device including the same, and a method of driving the same.

In an embodiment, a regulator may include a bias current generation circuit including a first input terminal and a second input terminal and configured to generate a bias current in response to at least one of a voltage applied to the first input terminal and a voltage applied to the second input terminal, and a current source circuit including a plurality of current sources connected in parallel and configured to control a magnitude of the bias current. The regulator, the display device including the same, the electronic device including the same, and the method of driving the same according to embodiments of the disclosure may reduce power consumption.

According to embodiments of the disclosure, the regulator may further include an operational amplifier in which the bias current generation circuit is disposed. The bias current generation circuit may further include a driving terminal to which regulator driving power is applied, a first operation amplification transistor electrically connected to the driving terminal and generating at least a portion of the bias current in response to the voltage applied to the first input terminal, and a second operational amplification transistor electrically connected to the driving terminal and generating a remaining portion of the bias current in response to the voltage applied to the second input terminal.

The current source circuit may further include a plurality of switching elements configured to control an operation of each of the plurality of current sources. Each of the plurality of current sources may be electrically connected to the first operational amplification transistor and the second operational amplification transistor.

The plurality of switching elements may be controlled in response to a regulator control signal.

At least two of the plurality of current sources may have different current driving capabilities.

All of the plurality of current sources may have the same current driving capability.

The second input terminal may be electrically connected to a feedback node. The regulator may further include a control transistor controlled in response to a voltage of an output terminal of the operational amplifier and configured to provide an electrical connection between the driving terminal and an output node, a first feedback resistor connected between the control transistor and the feedback node, a second feedback resistor connected between the first feedback resistor and a ground terminal, and an output capacitor including one electrode connected to the output node and another electrode connected to the ground terminal.

Embodiments of the disclosure provide a display device. The display device may include a display panel including a plurality of sub-pixels, a plurality of scan lines electrically connected to the plurality of sub-pixels, a plurality of data lines electrically connected to the plurality of sub-pixels, and a plurality of power lines electrically connected to the plurality of sub-pixels; a gate driving circuit including a scan driver configured to supply a scan signal to the plurality of scan lines, and a panel driving circuit including a data driver configured to supply a data signal to the plurality of data lines, a timing controller configured to control a driving timing of the data driver and the gate driving circuit, and a power generator configured to generate a plurality of target voltages. The power generator may include a plurality of regulators, each configured to generate a respective one of the plurality of target voltages, each of the target voltages being supplied to the display panel, the gate driving circuit, or the data driver, the timing controller may supply a regulator control signal for controlling the power generator, and a bias current of at least one of the plurality of regulators may be adjusted according to the regulator control signal.

Each of the plurality of sub-pixels may include a pixel circuit, and the pixel circuit may be connected to corresponding one of the plurality of data lines. The display panel may display an image during a plurality of frame periods. At least one of the plurality of frame periods may include an active period in which the data signal is written to the pixel circuit of each of the plurality of sub-pixels, and a blank period in which at least one transistor maintains a turn-off state in the pixel circuit of each of the plurality of sub-pixels.

The timing controller may transmit different regulator control signals in the active period and the blank period.

A magnitude of the bias current of the at least one regulator in the active period may be greater than a magnitude of the bias current of the at least one regulator in the blank period.

A current amount of the bias current may sequentially change when of the at least one regulator is changed from the active period to the blank period or from the blank period to the active period.

The power generator may include a resistance string configured to generate a plurality of input voltages, and any one of the plurality of input voltages may be input to each of the plurality of regulators.

Embodiments of the disclosure provide an electronic device. The electronic device may include a host configured to transmit input image data, a power supply circuit configured to supply regulator driving power, and a display device comprising a display panel including a plurality of sub-pixels, a data driver configured to supply a data signal to the plurality of sub-pixels, a gate driving circuit configured to supply a gate signal to the plurality of sub-pixels, a regulator configured to generate a constant voltage derived from the regulator driving power, and a timing controller for controlling the regulator, the data driver, and the gate driving circuit. The timing controller may control the data driver to output the data signal corresponding to the received input image data to the display panel in an active period of one frame period, and control the gate driving circuit so that the plurality of sub-pixels emit light based on the data signal supplied during the active period in a blank period of the one frame period, and the timing controller may output a regulator control signal for variably controlling a magnitude of a bias current of the regulator.

The host may transmit information on a driving frequency, the timing controller may generate a vertical synchronization signal and a data enable signal based on the received information on the driving frequency, the vertical synchronization signal may define a length of one frame period, and the data enable signal may define the active period and the blank period in the one frame period.

The host may output input image data to the display device, and the display device may display an image corresponding to the input image data. The host may receive temperature data and output a condition signal including temperature information of the temperature data and luminance information of the input image data. The timing controller may output the regulator control signal corresponding to the temperature information and the luminance information.

The timing controller may include a memory, and the timing controller may output a digital signal value corresponding to the temperature information and the luminance information as the regulator control signal with reference to the memory.

The timing controller may control the magnitude of the bias current to be increased when a luminance increases based on the luminance information.

A plurality of scan lines electrically connected to the plurality of sub-pixels and to which the gate signal is applied, a plurality of data lines electrically connected to the plurality of sub-pixels and to which the data signal is applied, and a plurality of power lines electrically connected to the plurality of sub-pixels may be disposed in the display panel. At least one of the plurality of sub-pixels may include a first transistor connected between a first node and a second node and including a gate electrode connected to a third node, a second transistor configured to switch an electrical connection between a corresponding one of the plurality of data lines and the first node, a third transistor configured to switch an electrical connection between the second node and the third node, and a fourth transistor configured to switch an electrical connection between a power line to which a first initialization voltage is applied among the plurality of power lines and the third node. At least one of the third transistor and the fourth transistor may include an oxide semiconductor.

Embodiments of the disclosure may provide a method of driving an electronic device including a host configured to output input image data and a control signal, a display device configured to display an image corresponding to the input image data based on the control signal, and a power supply circuit configured to supply regulator driving power to the display device. The method may include outputting, by the host, a vertical synchronization signal defining one frame period and a data enable signal defining an active period and a blank period in the one frame period, outputting, by a timing controller of the display device, different regulator control signals in the active period and the blank period in response to the vertical synchronization signal and the data enable signal, and generating, by the regulator of the display device configured to generate a constant voltage, a bias current of different magnitudes in the active period and the blank period in response to the regulator control signal.

BRIEF DESCRIPTION OF THE DRAWINGS

The above and other features of the disclosure will become more apparent by describing in further detail embodiments thereof with reference to the accompanying drawings, in which:

FIG. 21A is an example of a 2a-th lookup table LUT2*a* including temperature values, luminance values, and digital signal values according to a combination thereof.

FIG. 21B is an example of a 2b-th lookup table LUT2*b* including the temperature values, the luminance values, and digital signal values according to a combination thereof.

DETAILED DESCRIPTION OF EMBODIMENTS

Figure 1:
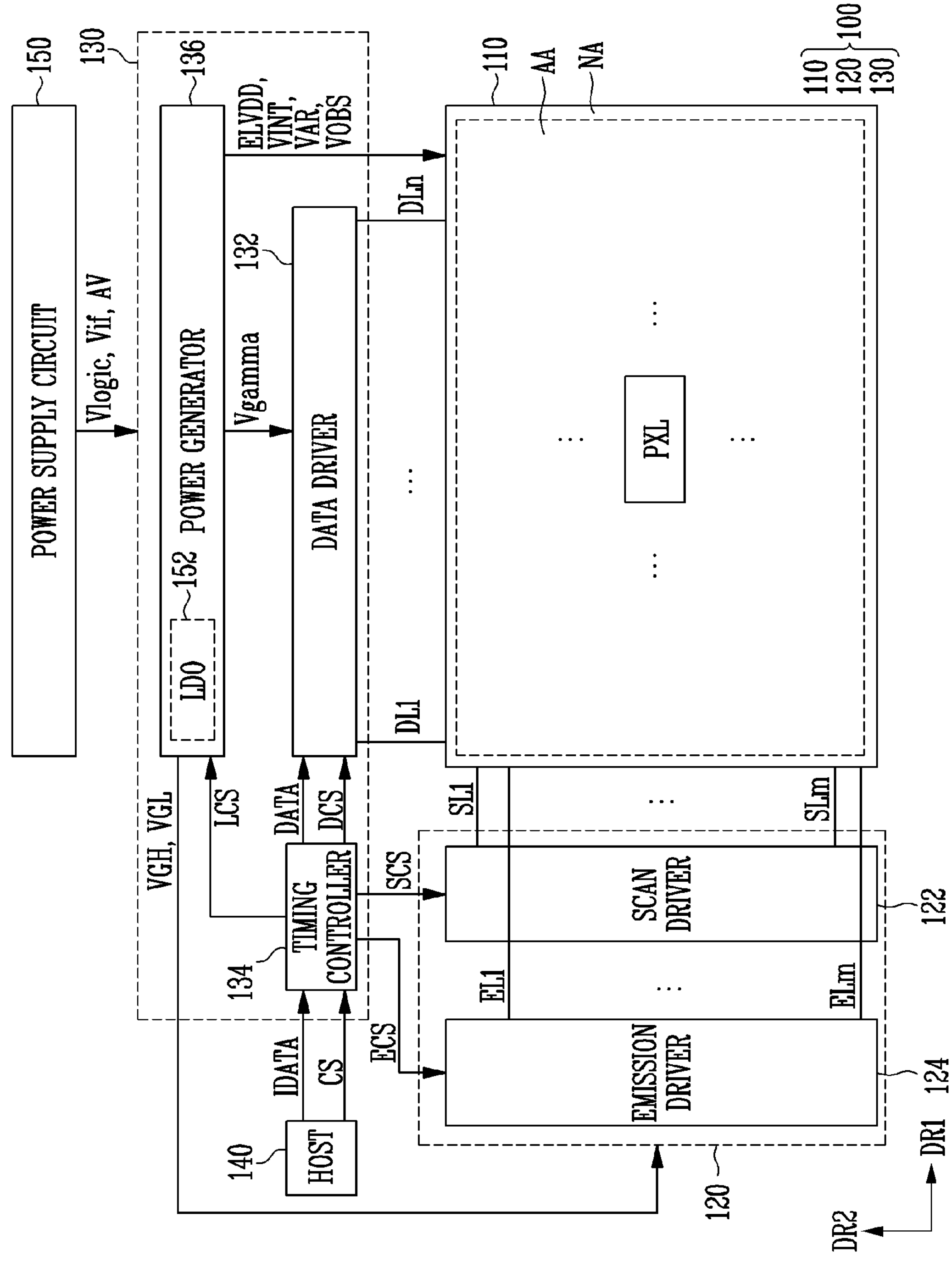
FIG. 1 is a system block diagram of a display device according to embodiments of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

To clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. The singular expressions include plural expressions unless the context clearly indicates otherwise.

Unless defined otherwise, all terms (including technical terms and scientific terms) used herein have the same meaning as a meaning generally understood by one of ordinary skill in the art to which the disclosure belongs. In addition, terms such as terms defined in a generally used dictionary are to be interpreted as having a meaning consistent with a meaning in a context of the related art, and are explicitly defined herein unless interpreted in an ideal or overly formal meaning.

It should be understood that a term of "include", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance.

Herein, two circuit elements described as "connected" are electrically connected, unless the context indicates otherwise. The connection may be a direct connection (e.g., the two circuit elements are connected to a common circuit node in a schematic diagram) or an indirect connection (electrical connection is made between the two circuit elements through another circuit element).

Herein, once an element (e.g., a circuit, a signal, a voltage, etc.) is introduced by a name followed by a legend, the element may be later referred to by a shortened version of the name followed by the legend, or by just the legend itself. For example, a "regulator driving power voltage AV" may be later referred to as just "voltage AV", or just "AV"; or an "analog reference voltage generator 610" may be later called "generator 610".

Hereinafter, embodiments of the disclosure are described in detail with reference to the accompanying drawings.

FIG. 1 is a system block diagram of a display device 100 according to embodiments of the disclosure.

Referring to FIG. 1, the display device 100 according to embodiments of the disclosure may include a display panel 110, a gate driving circuit 120, a panel driving circuit 130, and the like.

A plurality of pixels PXL are disposed in the display panel 110. In the display panel 110, a plurality of data lines DL1, . . . , and DLn (n is an integer of 2 or more), a plurality of scan lines SL1, . . . , and SLm (m is an integer of 2 or more), a plurality of emission lines EL1, . . . , and Elm, and the like electrically connected to the plurality of pixels PXL may be disposed. In the display panel 110, one or more power voltage lines configured to apply a power voltage (for example, a first power voltage ELVDD, a second power voltage VINT, a third power voltage VAR, and a fourth power voltage VOBS, and the like) may be disposed.

The display panel 110 may include a display area AA in which the plurality of pixels PXL are disposed and a non-display area NA positioned in a peripheral area of the display area AA (for example, an edge area of the display area AA).

The display panel 110 may be formed flat (for example, even), but embodiments of the disclosure are not limited thereto. For example, the display panel 110 may include curved portions (not shown) formed at left and right side ends. A curved surface of the curved portion may have a constant curvature or a varying curvature. In addition, the display panel 110 may be formed to be flexible so as to be bent, folded, or rolled.

Each of the plurality of pixels PXL may include two or more sub-pixels. For example, the plurality of sub-pixels may be disposed in a matrix structure, a PENTILE™ structure, or the like. However, embodiments of the disclosure are not limited to the above-described structure.

The plurality of scan lines SL1 to SLm may extend in the first direction DR1 and may be disposed in the display panel 110. The first direction DR1 may be, for example, a direction from a left side of the display panel 110 to a right side. However, embodiments of the disclosure are not limited thereto.

The plurality of emission lines EL1 to Elm may extend in the first direction DR1 and may be disposed in the display panel 110. However, embodiments of the disclosure are not limited thereto.

The plurality of data lines DL1 to DLn may extend in a second direction DR2 and may be disposed in the display panel 110. The second direction DR2 may be a direction different from the first direction DR1 (for example, a direction crossing the first direction DR1). The second direction DR2 may be, for example, a direction perpendicular to the first direction DR1. The second direction DR2 may be, for example, a direction from an upper side to a lower side of the display panel 110.

The gate driving circuit 120 may include a scan driver 122 and an emission driver 124. The gate driving circuit 120 is configured to output a gate signal (for example, a scan signal, an emission signal, and the like) having a high level voltage VGH or a low level voltage VGL to a gate line (for example, a scan line SL, an emission line EL, and the like) in response to an input control signal.

The scan driver 122 may output the scan signal (for example, a turn-on level of scan signal) to the plurality of scan lines SL1 to SLm in response to a scan driver control signal SCS. For example, the scan driver control signal SCS may include a start signal indicating a start of a frame, a horizontal synchronization signal for outputting the gate signal (for example, the scan signal) according to a timing at which a data voltage is applied, and the like.

The scan driver 122 may be implemented as an integrated circuit (for example, a gated driver integrated circuit (GDIC)) formed separately from the display panel 110. Alternatively, the scan driver 122 may be formed together with the display panel 110 and may be formed in at least partial area of the non-display area NA of the display panel 110. According to an embodiment, at least a portion of the scan driver 122 may be positioned to overlap the display area AA.

The emission driver 124 may output the emission signal (for example, a turn-on level of emission signal) to the plurality of emission lines EL1 to Elm in response to an emission driver control signal ECS. For example, the emission driver control signal ECS may include a start signal, a horizontal synchronization signal for outputting the gate signal (for example, the emission signal), and the like.

The emission driver 124 may be implemented as an integrated circuit formed separately from the display panel 110. Alternatively, the emission driver 124 may be formed together with the display panel 110 and may be formed in at least partial area of the non-display area NA of the display panel 110. According to an embodiment, at least a portion of the emission driver 124 may overlap the display area AA.

The panel driving circuit 130 may include a data driver 132, a timing controller 134, and a power generator 136. The panel driving circuit 130 may be implemented as one integrated circuit, or according to an embodiment, the panel driving circuit 130 may be divided into two or more integrated circuits and may be implemented. For example, the data driver 132, the timing controller 134, the power generator 136, and the like may be functionally classified within one integrated circuit. For example, at least one of the data driver 132, the timing controller 134, and the power generator 136 may be implemented by being divided into an integrated circuit different from any one of the others. For convenience of description, an embodiment in which the data driver 132, the timing controller 134, and the power generator 136 are implemented as the panel driving circuit 130 which is one integrated circuit is described below as an example, but embodiments of the disclosure are not limited thereto. The panel driving circuit 130 may be implemented as, for example, a timing controller embedded driver integrated circuit (TED-IC).

The data driver 132 may supply a data voltage to the plurality of data lines DL1 to DLn. The data driver 132 may generate the data voltage based on image data DATA, a data driver control signal DCS, and a gamma voltage Vgamma. The data driver 132 may output the generated data voltage to the plurality of data lines DL1 to DLn according to a timing. The data driver control signal DCS may include, for example, a source start pulse (SSP), a source shift clock (SSC), a source output enable (SOE), and the like.

The timing controller 134 may be configured to control the data driver 132, the gate driving circuit 120, the power generator 136, and the like. The timing controller 134 may receive a control signal CS (for example, a synchronization signal, a data enable signal, a clock signal, and the like) from an external component (for example, a host 140). The timing controller 134 may generate and output control signals DCS, SCS, ECS, LCS for controlling the data driver 132, the gate driving circuit 120, the power generator 136, and the like, based on the input control signal CS.

The timing controller 134 may receive input image data IDATA from the outside (for example, the host 140) and arrange the input image data IDATA in a pixel row unit. The timing controller 134 may convert the input image data IDATA according to a preset interface (for example, low voltage differential signaling (LVDS), a display port (DP), an embedded display port (eDP), and the like). The image data DATA output from the timing controller 134 to the data driver 132 may be converted inside the timing controller 134 according to the preset interface.

The timing controller 134 may receive the input image data IDATA, the control signal CS, and the like from the outside (for example, the host 140) through an interface such as a serial peripheral interface (SPI), an inter integrated circuit (I2C), or a mobile industry processor interface (MIPI).

The timing controller 134 may be disposed in the display device 100 in a logic or processor type. The timing controller 134 may include one or more registers.

The timing controller 134 may receive power (for example, interface driving power Vif, logic driving power Vlogic, and the like) from an exterior source (e.g., a power supply circuit 150). The timing controller 134 may convert the input image data IDATA according to the preset interface or may arrange the input image data IDATA in the pixel row unit using input power.

The power generator 136 is configured to receive a voltage from the power supply circuit 150, lower the supplied voltage, and supply a voltage of an appropriate level to various circuitry of the display device 100. For example, the power generator 136 may include a resistor string for lowering a voltage level by distributing driving power (for example, power from a regulator driving power voltage AV) supplied from the power supply circuit 150.

The power generator 136 may include a regulator 152 for maintaining a voltage level constant. The regulator 152 may be implemented as, for example, a low-dropout (LDO) regulator. The regulator 152 may be used to supply power of a stable voltage level by reducing or removing noise included in the input power.

The power generator 136 may supply the first power voltage ELVDD, the second power voltage VINT, the third power voltage VAR, the fourth power voltage VOBS, and the like to the display panel 110. The power generator 136 may supply a high level voltage VGH, a low level voltage VGL, and the like to the gate driving circuit 120. The power generator 136 may supply the gamma voltage Vgamma to the data driver 132.

The host 140 may execute, for example, software (for example, a program) to control another component (for example, the display device 100) connected to the host 140, and may perform various data processing or calculations. The host 140 may include, for example, a set-top box, an application processor (AP), and the like.

The power supply circuit 150 may supply various types of power. For example, the power supply circuit 150 may supply the logic driving power Vlogic, the interface driving power Vif, the regulator driving power voltage AV, and the like. The power supply circuit 150 may supply a first power voltage ELVDD, but according to an embodiment, the power generator 136 may generate the first power voltage ELVDD and supply the first power voltage ELVDD to the display panel 110. The power supply circuit 160 may be implemented as, for example, a power management integrated circuit (PMIC).

The display device 100 according to embodiments of the disclosure may be used as a display screen of various products such as a television, a notebook computer, a monitor, a billboard, Internet of Things (IOT) as well as a portable electronic device such as a mobile phone, a smart phone, a tablet personal computer (PC), a smart watch, a watch phone, a mobile communication terminal, an electronic notebook, an electronic book, a portable multimedia player (PMP), a navigation device, an ultra mobile personal computer (UMPC). The display device 100 according to embodiments of the disclosure may be used as a display screen of a virtual reality (VR) device, an augmented reality (AR) device, and the like.

When the display device 100 is used as the display screen of the VR device, the AR device, and the like, the display device 100 may be positioned very close to user's eyes. When the display device 100 is used as the display screen of the VR device, the AR device, and the like, an integration degree of the pixel PXL of the display device 100 may be high. As one method for increasing the integration degree of the pixel PXL, the pixel PXL may be formed on a silicon substrate. A technology of forming a pixel circuit and a light emitting element (for example, an organic light emitting diode (OLED)) connected thereto on the silicon substrate may be referred to as OLED on silicon (OLEDoS).

Figure 2:
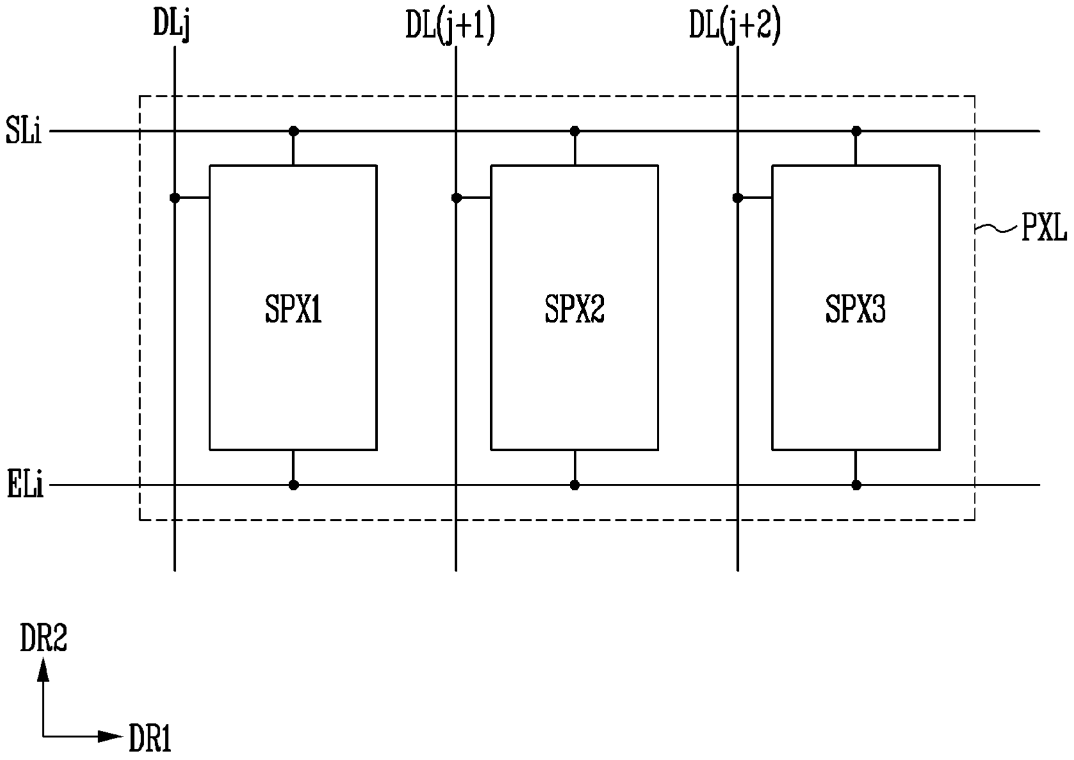
FIG. 2 is a diagram schematically expressing a pixel of FIG. 1.

FIG. 2 is a diagram schematically expressing the pixel PXL of FIG. 1.

As shown in FIG. 2, the pixel PXL may include a plurality of sub-pixels SPX1, SPX2, and SPX3. In FIG. 2, the pixel PXL includes three sub-pixels SPX1, SPX2, and SPX3, that is, a first sub-pixel SPX1, a second sub-pixel SPX2, and a third sub-pixel SPX3, but embodiments of the disclosure are not limited thereto.

Each of the first sub-pixel SPX1, the second sub-pixel SPX2, and the third sub-pixel SPX3 may be electrically connected to any one of a plurality of data lines DLj, DL(j+1), and DL(j+2) (j is an integer of 1 or more, and less than or equal to n). Each of the first sub-pixel SPX1, the second sub-pixel SPX2, and the third sub-pixel SPX3 may be electrically connected to at least one scan line Sli (I is an integer of 1 or more, and less than or equal to m) among a plurality of scan lines. Each of the first sub-pixel SPX1, the second sub-pixel SPX2, and the third sub-pixel SPX3 may be electrically connected to at least one emission line eLi among a plurality of emission lines. For example, referring to FIG. 2, the first sub-pixel SPX1 may be electrically connected to a j-th data line DLj, an i-th scan line sLi, and an i-th emission line eLi. The second sub-pixel SPX2 may be electrically connected to a (j+1)-th data line DL(j+1), the i-th scan line sLi, and the i-th emission line eLi. The third sub-pixel SPX3 may be electrically connected to a (j+2)-th data line DL(j+2), the i-th scan line sLi, and the i-th emission line eLi.

The sub-pixel SPX (any of the first sub-pixel SPX1, the second sub-pixel SPX2, and the third sub-pixel SPX3) or an emission area of the sub-pixel SPX may have a planar shape of a rectangle, a square, rhombus, or the like. For example, each of the first sub-pixel SPX1, the second sub-pixel SPX2, and the third sub-pixel SPX3 may have a planar shape of a rectangle having a short side of the first direction DR1 and a long side of the second direction DR2 as shown in FIG. 2. However, embodiments of the disclosure are not limited thereto, and the sub-pixel SPX or the emission area of the sub-pixel SPX may be a circle, a polygon, or the like.

At least two of the first sub-pixel SPX1, the second sub-pixel SPX2, and the third sub-pixel SPX3 may be arranged side by side in the first direction DR1. For example, as shown in FIG. 2, the first sub-pixel SPX1, the second sub-pixel SPX2, and the third sub-pixel SPX3 may be arranged side by side in the first direction DR1. Alternatively, any one of the second sub-pixel SPX2 and the third sub-pixel SPX3 and the first sub-pixel SPX1 may be arranged in the first direction DR1, and the other one and the first sub-pixel SPX1 may be arranged in the second direction DR2. Alternatively, any one of the first sub-pixel SPX1 and the third sub-pixel SPX3 and the second sub-pixel SPX2 may be arranged in the first direction DR1, and the other one and the second sub-pixel SPX2 may be arranged in the second direction DR2. However, embodiments of the disclosure are not limited to the above-described examples.

The first sub-pixel SPX1 may emit light of a first wavelength band, the second sub-pixel SPX2 may emit light of a second wavelength band, and the third sub-pixel SPX3 may emit light of a third wavelength band. The light of the first wavelength band may be light of a red wavelength band, the light of the second wavelength band may be light of a green wavelength band, and the light of the third wavelength band may be light of a blue wavelength band. The red wavelength band may be a wavelength band of approximately 600 nm (nanometer) to 750 nm, the green wavelength band may be a wavelength band of approximately 480 nm to 560 nm, and the blue wavelength band may be a wavelength band of approximately 370 nm to 460 nm. Embodiments of the disclosure are not limited thereto.

Each of the first sub-pixel SPX1, the second sub-pixel SPX2, and the third sub-pixel SPX3 may include a light emitting element for emitting light. For example, each of the first sub-pixel SPX1, the second sub-pixel SPX2, and the third sub-pixel SPX3 may include an organic light emitting diode (OLED) as the light emitting element, but embodiments of the disclosure are not limited thereto.

Figure 3:
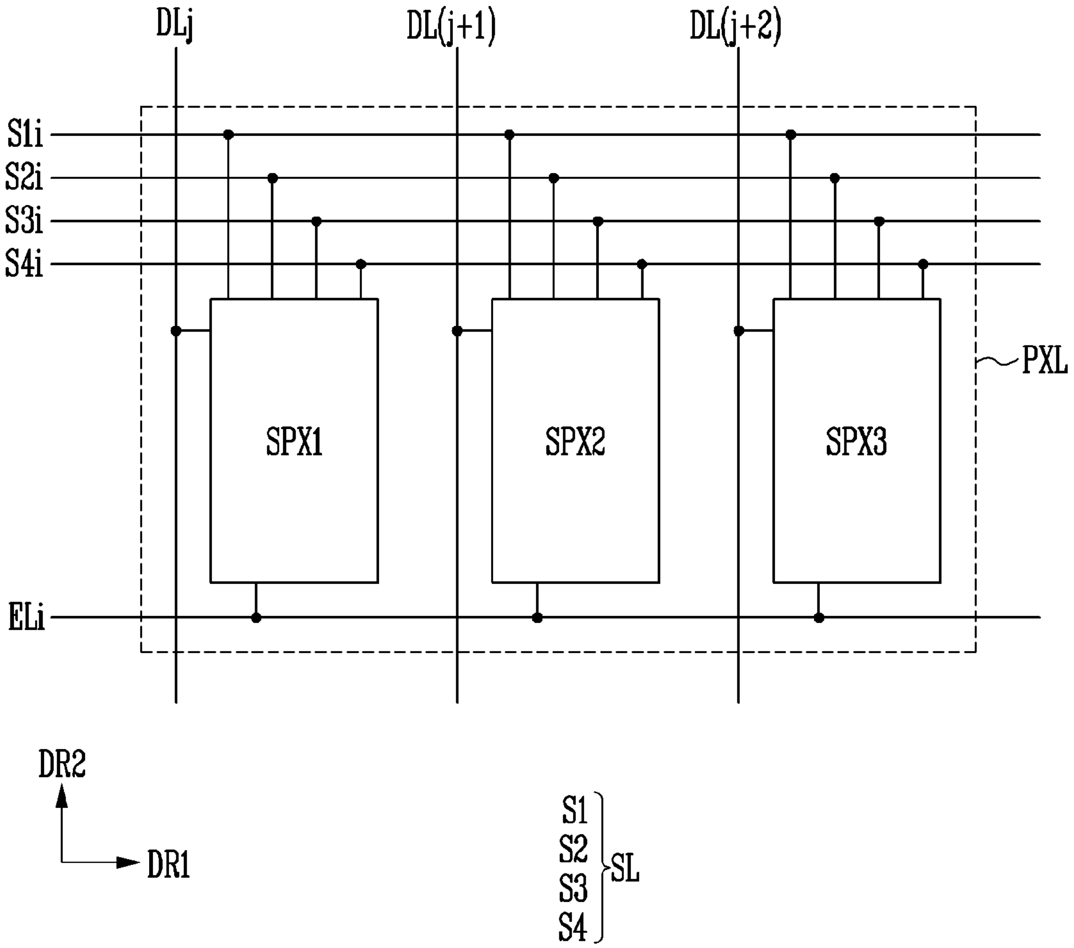
FIG. 3 is an embodiment of the pixel PXL of FIG. 2.

FIG. 3 is an embodiment of the pixel PXL of FIG. 2.

Referring to FIG. 3, the pixel PXL according to embodiments of the disclosure may include the first sub-pixel SPX1, the second sub-pixel SPX2, and the third sub-pixel SPX3.

Each of the first to fourth sub-pixels SPX1-SPX4 may be connected to an i-th first scan line S1$i$, an i-th second scan line S2$i$, an i-th third scan line S3$i$, and an i-th fourth scan line S4$i$ (first to fourth "scan lines S1$i$ to S4$i$").

Each of the first to third sub-pixels SPX1-SPX3 may be connected to an i-th emission line eLi ("emission line Eli").

For example, referring to FIG. 3, the first sub-pixel SPX1 may be connected to the j-th data line DLj, the i-th first to fourth scan lines S1$i$ to S4$i$, and the i-th emission line eLi. The second sub-pixel SPX2 may be electrically connected to the (j+1)-th data line DL(j+1), the i-th first to fourth scan lines S1$i$ to S4$i$, and the i-th emission line eLi. The third sub-pixel SPX3 may be connected to the (j+2)-th data line DL(j+2), the i-th first to fourth scan lines S1*i* to S4*i*, and the i-th emission line eLi.

Figure 4:
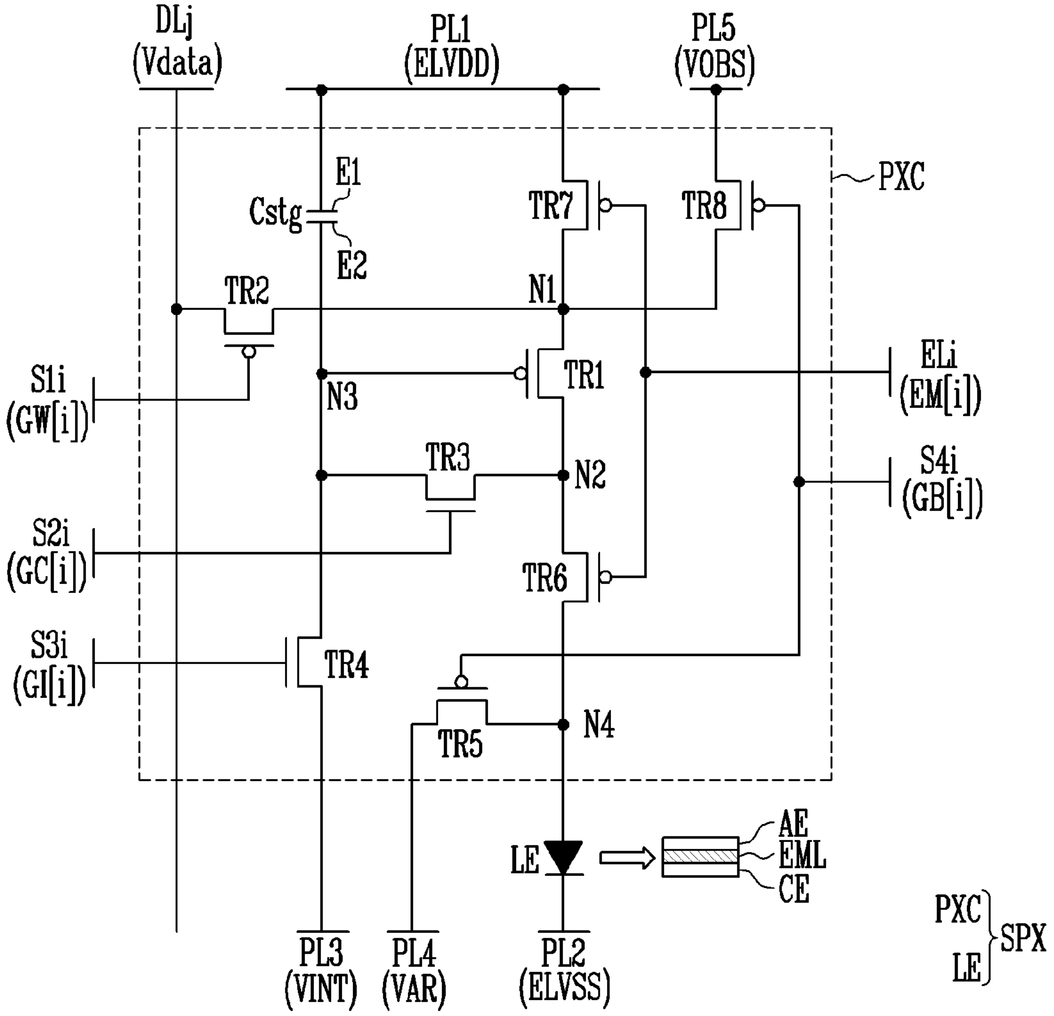
FIG. 4 is an example of an equivalent circuit diagram of a sub-pixel SPX of FIG. 3.

FIG. 4 is an example of an equivalent circuit diagram of the sub-pixel SPX of FIG. 3.

The sub-pixel SPX according to embodiments of the disclosure may include a pixel circuit PXC and a light emitting element LE. The pixel circuit PXC may include one or more switching elements (for example, transistors) and one or more storage elements (for example, capacitors).

The sub-pixel SPX shown in FIG. 4 is connected to the j-th data line DLj, the i-th first to fourth scan lines S1*i* to S4*i*, and the i-th emission line eLi. This may correspond to the first sub-pixel SPX1 (refer to FIG. 3) described above with reference to FIG. 3. A description of the sub-pixel SPX shown in FIG. 4 may be similarly applied to the second sub-pixel SPX2 and the third sub-pixel SPX3 described with reference to FIG. 3.

Referring to FIG. 4, the pixel circuit PXC according to embodiments of the disclosure may include first to eighth pixel transistors TR1 to TR8 and a storage capacitor Cstg. However, embodiments of the disclosure are not limited thereto.

The first pixel transistor TR1 may be configured to generate a current (for example, a driving current) flowing through the light emitting element LE. The first pixel transistor TR1 may be connected between a first node N1 and a second node N2. A gate electrode of the first pixel transistor TR1 may be connected to a third node N3. One electrode (for example, a source electrode) of the first pixel transistor TR1 may be connected to the first node N1. Another electrode (for example, a drain electrode) of the first pixel transistor TR1 may be connected to the second node N2. The first pixel transistor TR1 may be referred to as a driving transistor.

The second pixel transistor TR2 may switch an electrical connection between the data line DLj and the first node N1 in response to a first scan signal GW[i]. The first scan signal GW[i] may be applied to the first scan line S1*i*. The second pixel transistor TR2 may be turned on in response to a turn-on level of first scan signal GW[i], and a data voltage Vdata (or a voltage corresponding to the data voltage Vdata) may be applied to the first node N1. The second pixel transistor TR2 may be referred to as a scan transistor.

The third pixel transistor TR3 may be configured to switch an electrical connection between the second node N2 and the third node N3. The third pixel transistor TR3 may switch a connection between the second node N2 and the third node N3 in response to a second scan signal GC[i]. The second scan signal GC[i] may be applied to the second scan line S2*i*. The third pixel transistor TR3 may electrically connect between the second node N2 and the third node N3 in response to a turn-on level of second scan signal GC[i]. When the third transistor TR3 is turned on, the first pixel transistor TR1 may be "connected as a diode" (its gate is tied to the drain or source). The third pixel transistor TR3 may be referred to as a compensation transistor.

The fourth pixel transistor TR4 may be configured to switch an electrical connection between the third node N3 and a third power line PL3. The fourth pixel transistor TR4 may switch the electrical connection between the third node N3 and the third power line PL3 in response to a third scan signal GI[i]. The third scan signal GI[i] may be applied to the third scan line S3*i*. A second power voltage VINT may be applied to the third power line PL3. The fourth pixel transistor TR4 may electrically connect between the third node N3 and the third power line PL3 in response to a turn-on level of third scan signal GI[i]. The second power voltage VINT may be referred to as a first initialization voltage VINT. The second power voltage VINT may have a turn-on level of the first pixel transistor TR1. The fourth pixel transistor TR4 may be referred to as a first initialization transistor.

The fifth pixel transistor TR5 may be configured to switch an electrical connection between a fourth node N4 and a fourth power line PL4. The fifth pixel transistor TR5 may switch the electrical connection between the fourth node N4 and the fourth power line PL4 in response to a fourth scan signal GB[i]. The fourth scan signal GB[i] may be applied to the fourth scan line S4*i*. The third power voltage VAR may be applied to the fourth power line PL4. The fifth pixel transistor TR5 may electrically connect between the fourth node N4 and the fourth power line PL4 in response to a turn-on level of fourth scan signal GB[i]. The third power voltage VAR may be referred to as a second initialization voltage VAR or an anode reset voltage VAR. The fifth pixel transistor TR5 may be referred to as a second initialization transistor.

The sixth pixel transistor TR6 may be configured to switch an electrical connection between the second node N2 and the fourth node N4. The sixth pixel transistor TR6 may switch the electrical connection between the second node N2 and the fourth node N4 in response to the emission signal EM[i]. The emission signal EM[i] may be applied to the emission line eLi. The sixth pixel transistor TR6 may electrically connect between the second node N2 and the fourth node N4 in response to a turn-on level of emission signal EM[i]. The sixth pixel transistor TR6 may be referred to as a first emission control transistor.

The seventh pixel transistor TR7 may be configured to switch an electrical connection between the first power line PL1 and the first pixel transistor TR1. The seventh pixel transistor TR7 may switch the electrical connection between the first power line PL1 and the first pixel transistor TR1 in response to the emission signal EM[i]. The first power voltage ELVDD may be applied to the first power line PL1. The seventh pixel transistor TR7 may electrically connect between the first power line PL1 and the first pixel transistor TR1 in response to a turn-on level of emission signal EM[i]. The seventh pixel transistor TR7 may be referred to as a second emission control transistor.

The eighth pixel transistor TR8 may be configured to switch an electrical connection between a fifth power line PL5 and the first node N1. The eighth pixel transistor TR8 may switch the electrical connection between the fifth power line PL5 and the first node N1 in response to a fourth scan signal GB[i]. The fourth power voltage VOBS may be applied to the fifth power line PL5. The eighth pixel transistor TR8 may electrically connect between the fifth power line PL5 and the first node N1 in response to a turn-on level of fourth scan signal GB[i]. The fourth power voltage VOBS may be referred to as an on-bias voltage VOBS. The eighth pixel transistor TR8 may be referred to as a bias control transistor. The fourth power voltage VOBS may be applied to the first pixel transistor TR1, and thus a characteristic value thereof may be maintained constant. According to this, it may be preferable that a voltage level of the fourth power voltage VOBS is controlled at a more precise level.

The storage capacitor Cstg may be configured to maintain a voltage applied to the third node N3. The storage capacitor Cstg may include one side electrode E1 connected to the first power line PL1 and another side electrode E2 connected to the third node N3.

The light emitting element LE may include a first electrode AE, a second electrode CE, and a light emitting layer EML. For example, the light emitting layer EML may be positioned between the first electrode AE and the second electrode CE. The first electrode AE may be any one of an anode electrode and a cathode electrode. The second electrode CE may be the other of the anode electrode and the cathode electrode. Hereinafter, for convenience of description, it is assumed that the first electrode AE is the anode electrode and the second electrode CE is the cathode electrode, but embodiments of the disclosure are not limited thereto.

The light emitting element LE may include the first electrode AE connected to the fourth node N4 and the second electrode CE connected to the second power line PL2. A low potential power voltage ELVSS may be applied to the second power line PL2. A current (for example, a driving current) of a magnitude corresponding to a voltage difference between a voltage applied to the fourth node N4 and the low potential power voltage ELVSS may flow through the light emitting element LE. The light emitting element LE may emit light with brightness corresponding to the voltage difference between the voltage applied to the fourth node N4 and the low potential power voltage ELVSS. Considering this, it may be preferable that a voltage level of the third power voltage VAR applied to the fourth node N4 is controlled at a more precise level. For example, when the voltage level of the third power voltage VAR is out of a preset range, a problem that the light emitting element LE unintentionally emits light and thus display quality is deteriorated may occur.

The light emitting layer EML may include an organic light emitting material of a high molecule or a low molecule. The light emitting layer EML may include an inorganic light emitting material or a quantum dot. For example, the light emitting layer EML may include an organic light emitting material of a high molecule or a low molecule for emitting light of a predetermined wavelength band (for example, the blue wavelength band, the green wavelength band, or the red wavelength band).

One or more transistors configuring the pixel circuit PXC may include a P-type semiconductor layer. For example, at least one of the first to eighth pixel transistors TR1 to TR8 may be implemented as a field effect transistor (FET) including a P-channel metal oxide semiconductor (PMOS). For example, at least one of the first to eighth pixel transistors TR1 to TR8 may be implemented as a FET including an N-channel metal oxide semiconductor (NMOS).

Referring to FIG. 4, an embodiment in which the first, second, and fifth to eighth pixel transistors TR1, TR2, and TR5 to TR8 are implemented as FETs including a P-type metal oxide semiconductor and the third and fourth pixel transistors TR3 and TR4 are implemented as FETs including an N-type metal oxide semiconductor is shown as an example. However, embodiments of the disclosure are not limited thereto. For example, at least one of the first, second, and fifth to eighth pixel transistors TR1, TR2, TR5 to TR8 may be implemented as a FET including an N-type metal oxide semiconductor. For example, at least one of the third and fourth pixel transistors TR3 and TR4 may be implemented as a FET including a P-type metal oxide semiconductor.

The pixel transistors configuring the pixel driving circuit PXC may include an amorphous silicon (a-Si) semiconductor, an oxide semiconductor, a low temperature polycrystalline silicon (LTPS) semiconductor, or the like. For example, a portion of the eight pixel transistors configuring the pixel driving circuit PXC may include the LTPS semiconductor, and the others may include the oxide semiconductor.

For example, the third pixel transistor TR3 and the fourth pixel transistor TR4 may include the oxide semiconductor, and the remaining pixel transistors TR1, TR2, and TR5 to TR8 may include the LTPS semiconductor. However, according to an embodiment, at least one of the third pixel transistor TR3 and the fourth pixel transistor TR4 may include the amorphous silicon semiconductor or the LTPS semiconductor. According to an embodiment, at least one of the remaining pixel transistors TR1, TR2, and TR5 to TR8 may include the oxide semiconductor.

The first to fourth scan signals GW[i], GC[i], GI[i], and GB[i] may be applied to different scan lines, respectively. For example, the first to fourth scan lines S1*i* to S4*i* may be separate scan lines different from each other.

According to an embodiment, at least two of the first to fourth scan signals GW[i], GC[i], GI[i], and GB[i] may be applied to the same scan line. For example, at least two of the first to fourth scan lines S1*i* to S4*i* may be implemented as one scan line.

According to an embodiment, only a phase of any one of the first to fourth scan signals GW[i], GC[i], GI[i], and GB[i] may be different from those of another. In this case, design and manufacture of the scan driver 122 (refer to FIG. 1) may be easy. However, embodiments of the disclosure are not limited thereto.

Figure 5A:
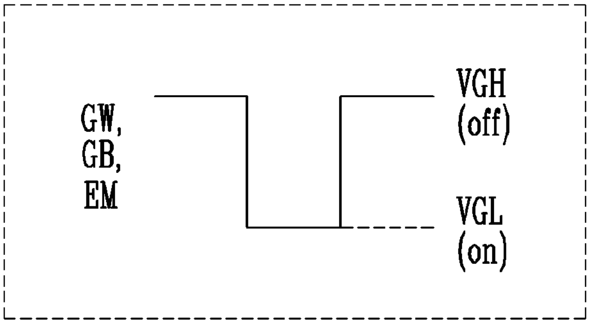
FIGS. 5A and 5B are diagrams illustrating a waveform of gate signals input to the sub-pixel SPX of FIG. 4.
Figure 5B:
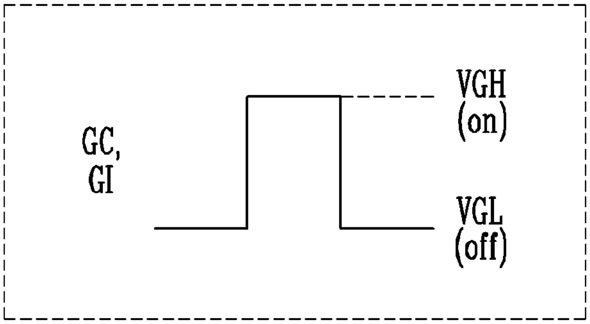

FIGS. 5A and 5B are diagrams illustrating a waveform of gate signals GW, GC, GI, GB, and EM input to the sub-pixel SPX of FIG. 4.

The gate signals may include the first to fourth scan signals GW, GC, GI, and GB and an emission signal EM. In embodiments of the disclosure, the gate signals may have a high logic level or a low logic level. In the following description, a signal of the high logic level is a high level voltage VGH as an example, and a signal of the low logic level is a low level voltage VGL as an example. However, embodiments of the disclosure are not limited thereto.

The high level voltage VGH may be a turn-off level voltage of a pixel transistor including a P-type (or P-channel) metal oxide semiconductor. The high level voltage VGH may be a turn-on level voltage of a pixel transistor including an N-type (or N-channel) metal oxide semiconductor.

The low level voltage VGL may be a turn-on level voltage of a pixel transistor including a P-type (or P-channel) metal oxide semiconductor. The low level voltage VGL may be a turn-off level voltage of a pixel transistor including an N-type (or N-channel) metal oxide semiconductor.

Referring to FIG. 5A, in the first scan signal GW, the fourth scan signal GB, and the emission signal EM, the high level voltage VGH may be a turn-off level voltage, and the low level voltage VGL may be a turn-on level voltage.

Referring to FIG. 5B, in the second scan signal GC and the third scan signal GI, the high level voltage VGH may be a turn-on level voltage and the low level voltage VGL may be a turn-off level voltage.

Figure 6:
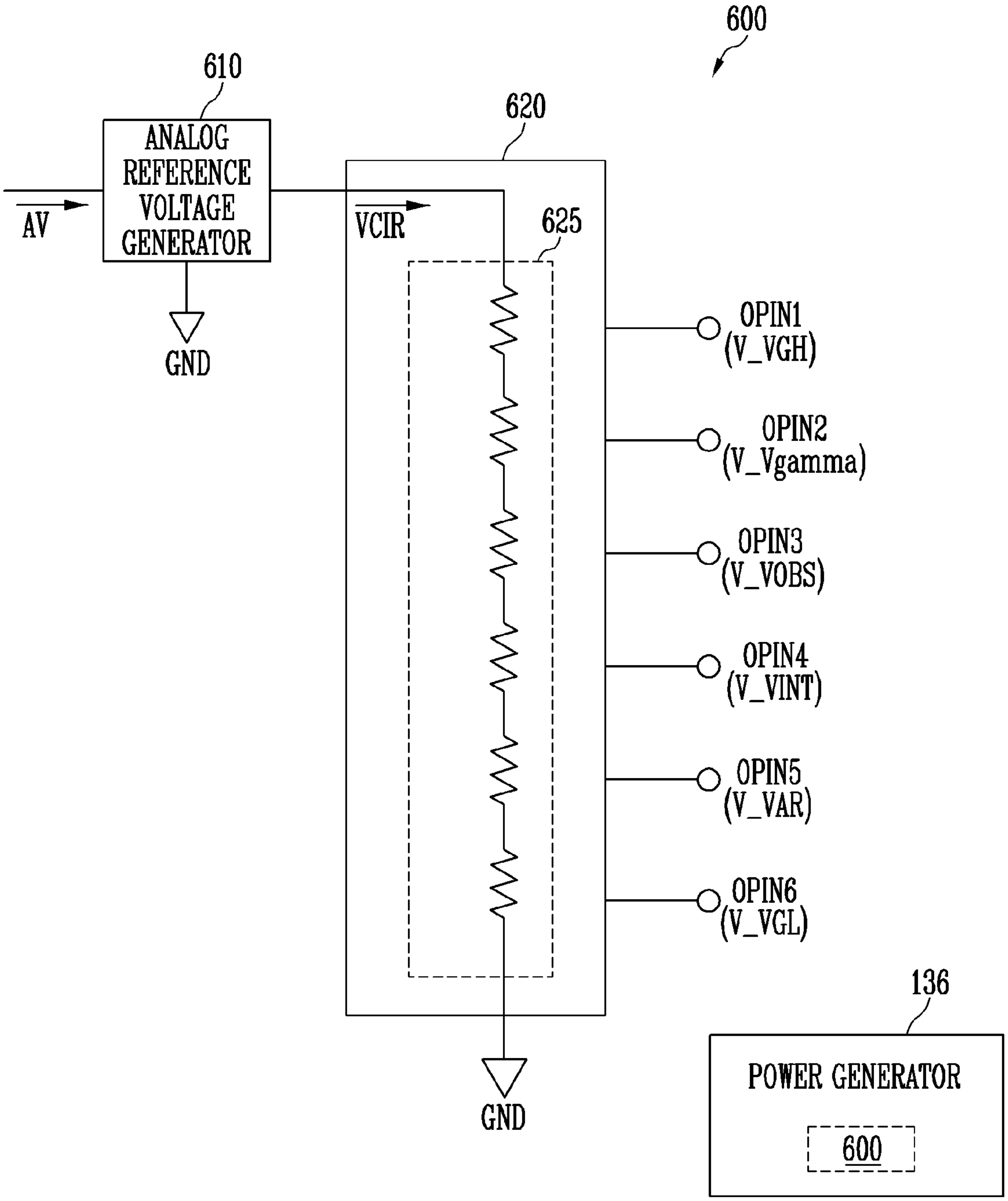
FIG. 6 is an example of input voltages generated by a power generator of FIG. 1.

FIG. 6 is a schematic of an example of example power generating circuitry, 600, within the power generator 136 of FIG. 1, and voltages generated thereby. Here, the power generating circuitry 600 may include an analog reference voltage generator 610 and a voltage generation block 620. The voltage generation block 620 may include a resistor string 625. The resistor string 625 may include a plurality of resistors connected in series.

The generator 610 may be configured to receive a voltage (e.g., the regulator driving power voltage AV), change (e.g., lower) a voltage level of the voltage received, and output a changed level of voltage (e.g., a reference voltage VCIR). For example, a level of the voltage AV input to the generator 610 may be about 3.0 V (volts). For example, a level of the reference voltage VCIR output from the generator 610 may be about 2.2 V. The generator 610 may be connected to a ground terminal, hereafter "ground GND".

The voltage generation block 620 may be configured to output two or more voltages. For example, the voltage generation block 620 may output at least one of a first input voltage V_VGH, a second input voltage V_Vgamma, a third input voltage V_VOBS, a fourth input voltage V_VINT, a fifth input voltage V_VAR, a sixth input voltage V_VGL, at respective output terminals OPIN1 to OPIN6. These voltages may be referred to herein as "target voltages", and may be substantially constant voltages. Referring further to FIG. 1 above, the first input voltage V_VGH may be a voltage for generating the high level voltage VGH (as in FIGS. 5A-5B). The second input voltage V_Vgamma may be a voltage for generating the gamma voltage Vgamma. The third input voltage V_VOBS may be a voltage for generating the fourth power voltage VOBS. The fourth input voltage V_VINT may be a voltage for generating the second power voltage VINT. The fifth input voltage V_VAR may be a voltage for generating the third power voltage VAR. The sixth input voltage V_VGL may be a voltage for generating the low level voltage VGL (as in FIGS. 5A-5B).

The voltage generation block 620 may include a resistor string 625 connected between the analog reference voltage generator 610 and the ground GND.

Figure 7:
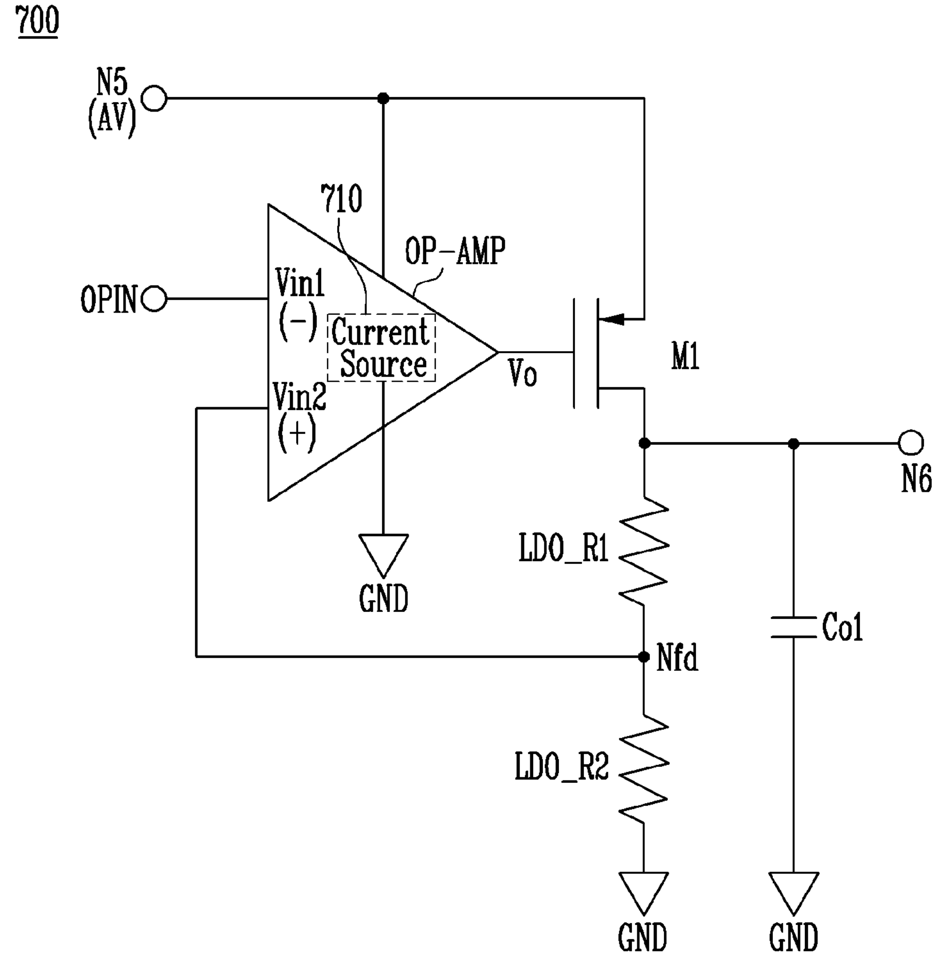
FIG. 7 is an embodiment of a regulator.

FIG. 7 is an embodiment of a regulator, 700.

Referring to FIG. 7, the regulator 700 may include an operational amplifier OP-AMP, a power transistor M1, a first feedback resistor LDO_R1, a second feedback resistor LDO_R2, an output capacitor Co1, and the like. The regulator 700 may be an LDO regulator and may be an embodiment of the regulator 152 shown in FIG. 1.

The OP-AMP may include a first input terminal Vin1, a second input terminal Vin2, and a driving terminal N5.

The first input terminal Vin1 is exemplified and described hereafter as an inverting input terminal but may be a non-inverting ("−") input terminal in other examples. The second input terminal Vin2 is exemplified as a non-inverting ("+") input terminal but may be an inverting input terminal in other examples. The first input terminal Vin1 may be connected to the above-described output pin OPIN (refer to FIG. 6). The second input terminal Vin2 may be connected to a feedback node Nfd. A voltage applied to the first input terminal Vin1 and the second input terminal Vin2 may provide a bias voltage to a transistor (or transistors) inside the OP-AMP. The OP-AMP may amplify a difference between a voltage input to the first input terminal Vin1 and a voltage input to the second input terminal Vin2 with a gain value (for example, a predetermined gain value), and output an amplified voltage from an output terminal Vo.

The driving terminal N5 provides driving power of the OP-AMP. For example, the regulator driving power AV may be applied to the driving terminal N5. The OP-AMP may receive the regulator driving power AV, and the regulator driving power AV may be used to drive the transistors inside the OP-AMP.

The power transistor M1 may be connected between the driving terminal N5 and a target voltage output terminal N6 (where the target voltage may be a substantially constant voltage as noted earlier). Currents of different magnitudes may flow through the power transistor M1 according to a magnitude of the voltage output from the OP-AMP output terminal Vo. The transistor M1 may provide an electrical connection between the driving terminal N5 and the output terminal N6. As illustrated, transistor M1 may be a P-channel FET (PFET), in which current flows from the source (arrow side) to the drain. (In alternative embodiments, transistor M1 may be an N-channel FET (NFET).) For example, when the magnitude of the voltage output from the output terminal Vo increases, more current may flow from the source to drain of transistor M1, and to the load connected to terminal N6 (where the load may be a combination of resistors LDO_R1, LDO_R2, capacitor Co1, and an output load (not shown) connected to terminal N6. For example, when the magnitude of the voltage output from the OP-AMP output terminal Vo decreases, a less current may flow from source to drain of transistor M1, such that the voltage at terminal N6 decreases. Thus, if there is a positive voltage spike or ripple at the node N6 (the target voltage undesirable increases), the spike or ripple may be effectively attenuated through the feedback loop mechanism. An analogous positive target voltage adjustment may be made in response to a drop in the target voltage at the output node N6.

The output capacitor Co1 may include one electrode and another electrode. The one electrode of the output capacitor Co1 may be connected to the target voltage output terminal N6. The output capacitor Co1 is configured to maintain a magnitude of the target voltage at the output terminal N6 constant. The other electrode of the output capacitor Co1 may be connected to the ground GND. For example, although a magnitude of the current flowing from the power transistor M1 to the output terminal N6 may vary according to the magnitude of the voltage output from the OP-AMP output terminal Vo, a fluctuation of a voltage applied to the output terminal N6 may be alleviated by the output capacitor Co1.

The first feedback resistor LDO_R1 and the second feedback resistor LDO_R2 are connected at a feedback node Nfd. The first feedback resistor LDO_R1 may be connected between the terminal N6 and the feedback node Nfd. The second feedback resistor LDO_R2 may be connected between the feedback node Nfd and the ground GND.

A process of adjusting the voltage of the output terminal N6 by the first feedback resistor LDO_R1 and the second feedback resistor LDO_R2 is described below.

For example, when the voltage of the output terminal N6 increases, a voltage of the feedback node Nfd increases. When the voltage of the feedback node Nfd increases, a voltage applied to the second input terminal Vin2 increases. Accordingly, a difference between the voltages applied to the first input terminal Vin1 and the second input terminal Vin2 may decrease, and the voltage output from the OP-AMP output terminal Vo may decrease. Accordingly, an amount of the current flowing in the direction from the power transistor M1 to output terminal N6 (current flow from the drain of transistor M1) may decrease, and thus the voltage of output terminal N6 may decrease.

For example, when the voltage of output terminal N6 decreases, the voltage of the feedback node Nfd may decrease. When the voltage of the feedback node Nfd decreases, the voltage applied to the second input terminal Vin2 decreases. Accordingly, the difference between the voltages applied to the first input terminal Vin1 and the second input terminal Vin2 may increase, and the voltage output from the OP-AMP output terminal Vo may increase. Accordingly, the amount of the current flowing in the direction from the power transistor M1 to output terminal N6 may increase, and thus the voltage of output terminal N6 may increase.

A constant level of constant voltage may be output to the output terminal N6 in a method described above.

Meanwhile, to continuously output a constant level of constant voltage from the OP-AMP, a bias current by the voltage input to the first input terminal Vin1 and the voltage input to the second input terminal Vin2 may continuously flow inside the OP-AMP. Accordingly, a problem that power consumption of the regulator 700 increases may occur.

Therefore, a method of reducing power consumption of the regulator 700 is required.

To this end, the regulator 700 according to embodiments of the disclosure may include a current source circuit 710, and may reduce power consumption of the regulator 700 by controlling a magnitude of a current flowing through the OP-AMP through the current source circuit 710.

Referring to FIG. 7, an embodiment in which the current source circuit 710 is positioned inside the OP-AMP (for example, included in the OP-AMP) is shown, but embodiments of the disclosure are not limited thereto. For example, the current source circuit 710 may be positioned outside the OP-AMP, and the current source circuit 710 and the OP-AMP may be configured as separate circuits.

Figure 8A:
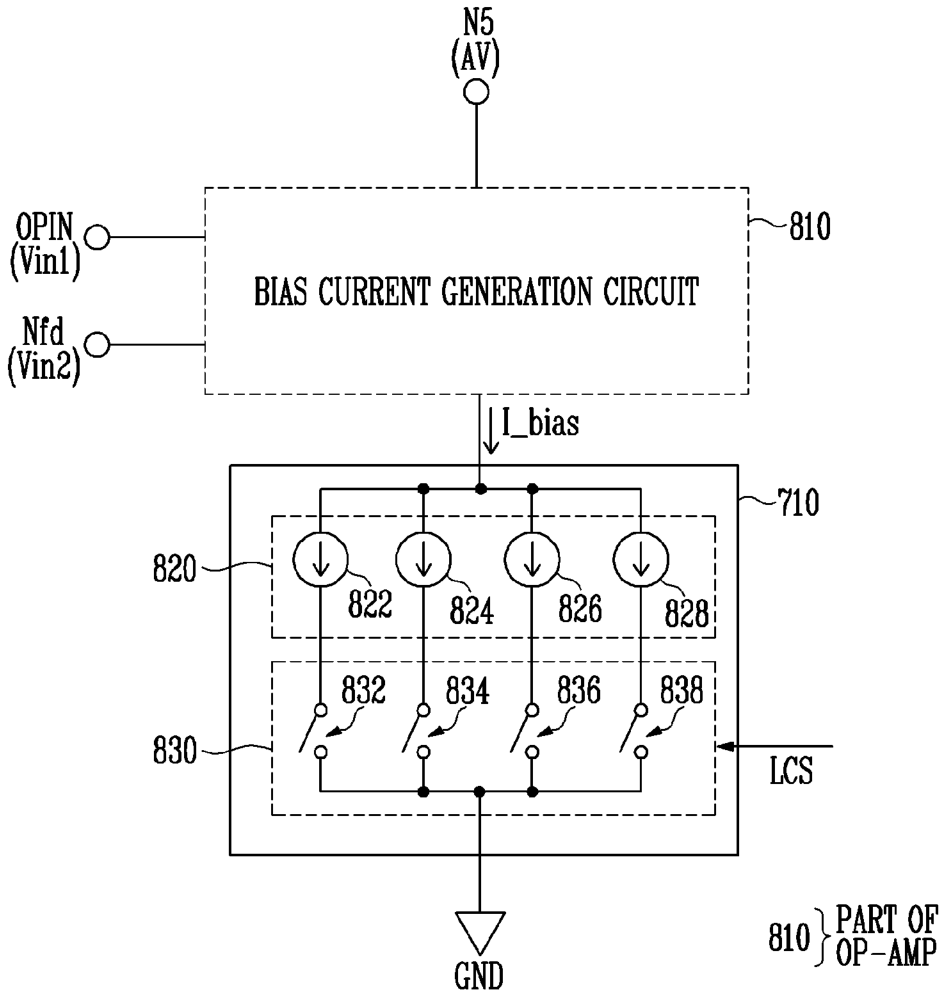
FIG. 8A is a diagram illustrating a bias current generation circuit and a current source circuit of the regulator of FIG. 7.
Figure 8B:
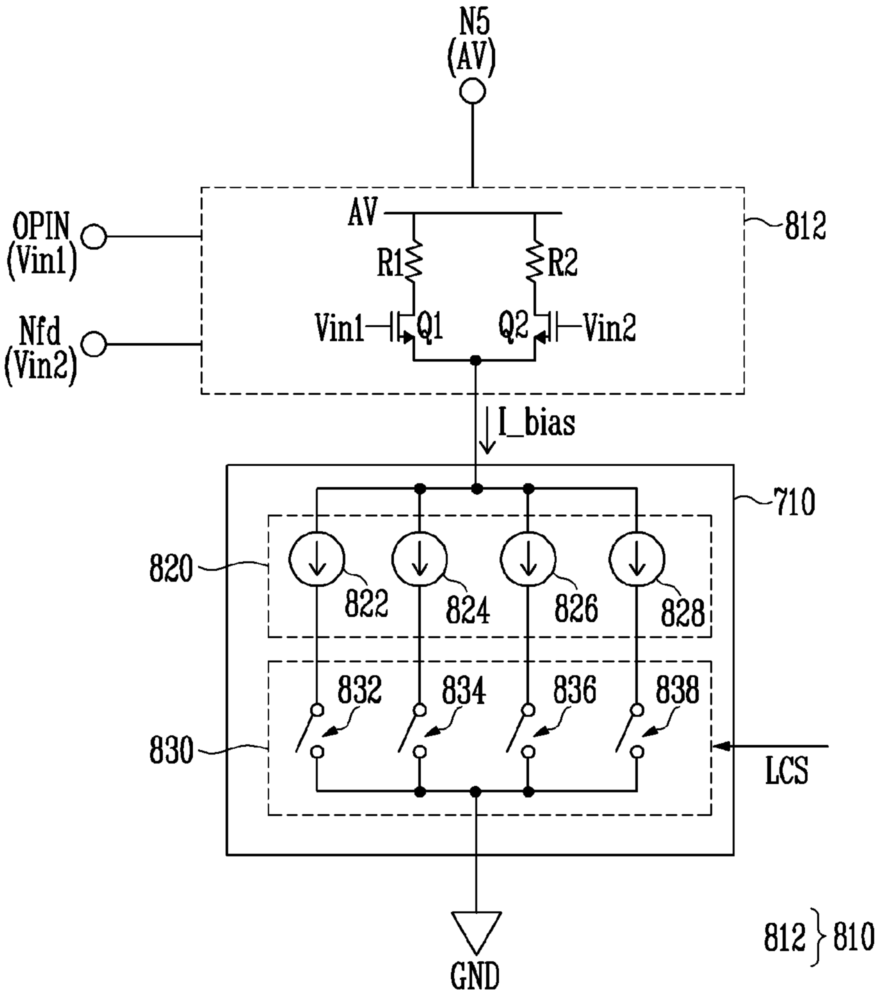
FIG. 8B is a diagram illustrating an embodiment of the bias current generation circuit of FIG. 8A.

FIG. 8A is a diagram illustrating a bias current generation circuit 810 and the current source circuit 710 of the regulator 700 of FIG. 7. FIG. 8B is a diagram illustrating an embodiment of the bias current generation circuit of FIG. 8A.

The OP-AMP includes the bias current generation circuit 810. The bias current generation circuit 810 may be connected to the first input terminal Vin1, the second input terminal Vin2, and the driving terminal N5. The first input terminal Vin1 is connected to the output pin OPIN. The second input terminal Vin2 is connected to the feedback node Nfd. Driving power (e.g., due to the regulator driving power voltage AV) is input to the driving terminal N5. The bias current generation circuit 810 may generate a bias current I_bias by a voltage applied to the first input terminal Vin1, the second input terminal Vin2, the driving terminal N5, and the like.

Referring to FIG. 8B, the bias current generation circuit 812 according to an embodiment may include a first internal resistor R1, a second internal resistor R2, a first operational amplification transistor Q1, a second operational amplification transistor Q2, and the like. The bias current generation circuit 812 may be at least part of an input differential amplifier stage of the OP-AMP. Note that the OP-AMP may further include an amplification stage (not shown) coupled to the bias current generation circuit 812, and an output stage (not shown) coupled to the amplification stage, where the output stage may provide the OP-AMP output voltage Vo. The bias current generation circuit 812 is an example of the bias current generation circuit 810 of FIG. 8A; however, alternative circuit configurations may be substituted.

The first internal resistor R1 may be connected between the voltage AV terminal and the first operational amplification transistor Q1.

The second internal resistor R2 may be connected between the voltage AV terminal and the second operation amplification transistor Q2.

The first operation amplification transistor Q1 may generate at least a portion of the bias current I_bias in response to the voltage applied to the first input terminal Vin1.

The second operation amplification transistor Q2 may generate a remaining portion of the bias current I_bias in response to the voltage applied to the second input terminal Vin2.

The bias current I_bias may be generated by the first operational amplification transistor Q1 and/or the second operational amplification transistor Q2. The bias current I_bias generated by the bias current generation circuit 812 is input to the current source circuit 710.

The current source circuit 710 may include a plurality of current sources 820. The plurality of current sources 820 may include, for example, a first current source 822, a second current source 824, a third current source 826, a fourth current source 828, and the like.

The first to fourth current sources 822 to 828 may be connected in parallel with each other. Each of the first to fourth current sources 822 to 828 may be connected to the first operational amplification transistor Q1 and/or the second operational amplification transistor Q2.

According to an embodiment, the plurality of current sources 820 may include at least two current sources having different current driving capabilities. For example, at least two of the first to fourth current sources 822 to 828 may have different current driving capabilities, where a "current driving capability" refers to a capability of providing a constant current. As an example, the first current source 822 may be configured to provide a constant current of 0.001 mA (milli Ampere). The second current source 824 may be configured to provide a constant current of 0.002 mA. The third current source 826 may be configured to provide a constant current of 0.004 mA. The fourth current source 828 may be configured to provide a constant current of 0.008 mA. In an example, a bias current I_bias of 0.001 to 0.015 mA may be precisely controlled and provided in a unit of 0.001 mA using 15 current sources arranged in parallel, akin to the first to fourth current sources 822 to 828.

According to an embodiment, the plurality of current sources 820 may include a plurality of current sources having the same current driving capability. For example, the plurality of current sources 820 may include 15 current sources having the same current driving capability of 0.001 mA. The plurality of current sources 820 may control 15 current sources to precisely adjust the bias current I_bias of 0.001 to 0.015 mA in a unit of 0.001 mA and provide the bias current I_bias.

In the following description, for convenience of description, an embodiment in which the plurality of current sources 820 includes at least two current sources having different current driving capabilities is described as an example, but embodiments of the disclosure are not limited thereto.

The current source circuit 710 may include a plurality of switching elements 830. The plurality of switching elements 830 may include, for example, a first switching element 832, a second switching element 834, a third switching element 836, a fourth switching element 838, and the like.

The first to fourth switching elements 832 to 838 may be configured to control operations of each of the first to fourth current sources 822 to 828. For example, when the first switching element 832 is turned on, at least a portion of the bias current I_bias may flow through the first current source 822. For example, when the second switching element 834 is turned on, at least a portion of the bias current I_bias may flow through the second current source 824. For example, when the third switching element 836 is turned on, at least a portion of the bias current I_bias may flow through the third current source 826. For example, when the fourth switching element 838 is turned on, at least a portion of the bias current I_bias may flow through the fourth current source 828.

The plurality of switching elements 830 may be controlled by the regulator control signal LCS. According to an embodiment, the regulator control signal LCS may have bits of a predetermined size. The regulator control signal LCS may have, for example, a size of 4 bits. The size (for example, a bit size) of the regulator control signal LCS may correspond to (e.g., may be the same as) the number of switching elements (for example, 4), but embodiments of the disclosure are not limited thereto.

For example, an operation of the plurality of switching elements 830 may be controlled by the regulator control signal LCS having the size of 4 bits. For example, the first switching element 832 may be turned on and the second to fourth switching elements 834 to 838 may be turned off by the regulator control signal LCS of 0001(2). For example, the third and fourth switching elements 836 and 838 may be turned on and the first and second switching elements 832 and 834 may be turned off by the regulator control signal LCS of 1100(2). Accordingly, at least a portion of the first to fourth switching elements 832 to 838 may be selectively turned on, and thus a magnitude of the bias current I_bias may be adjusted.

Referring to FIGS. 8A and 8B, an embodiment in which the plurality of switching elements 830 are connected between the plurality of current sources 820 and the ground GND is shown. However, embodiments of the disclosure are not limited thereto, and the plurality of switching elements may be connected between the bias current generation circuit 810 and the plurality of current sources 820.

When the magnitude of the bias current I_bias increases, a voltage regulation characteristic of the regulator 700 (refer to FIG. 7) is improved. The voltage regulation characteristic may include, for example, ripple voltage attenuation capability, line regulation, load regulation, power supply rejection ratio (PSRR), accuracy, and the like.

Ripple voltage attenuation capability may be a capability of removing noise of a voltage. Line regulation may refer to a change in an output for a change in an input. Load regulation may refer to a change in an output voltage according to a change in an output current. The power supply rejection ratio is a value indicating how much an alternating current (AC) component of a specific frequency is attenuated from an input to an output of the regulator. The accuracy is a value indicating how accurate a voltage output from the regulator 700 (refer to FIG. 7) is.

Referring to FIGS. 1 and 7 together, the voltage regulation characteristic of the regulator 700 may be differently controlled according to a driving frequency (or frame rate). A specific embodiment may be described in more detail with reference to FIGS. 11A and 11B to be described later. According to an embodiment, the voltage regulation characteristic of the regulator 700 may be controlled differently according to whether or not the voltage output from the power generator 136 is a power voltage (for example, the second power voltage VINT, the third power voltage VAR, and the like) input to the display panel 110, or the voltage output from the power generator 136 is a gate voltage (for example, the high level voltage VGH, the low level voltage VGL, and the like) input to the gate driving circuit 120. According to an embodiment, the voltage regulation characteristic of the regulator 700 may be differently controlled according to a temperature around the display device 100, a luminance of an image displayed on the display device 100, or the like.

Through this mechanism, power consumption of the display device 100 may be reduced by adaptively controlling a current flowing within the regulator 700 (and generating $I^2R$ loss) according to a situation within a range in which the display quality of the display device 100 does not deteriorate.

The above-described embodiments in which voltage regulation of the regulator 700 is controlled is described in more detail with reference to the drawings below.

Figure 9:
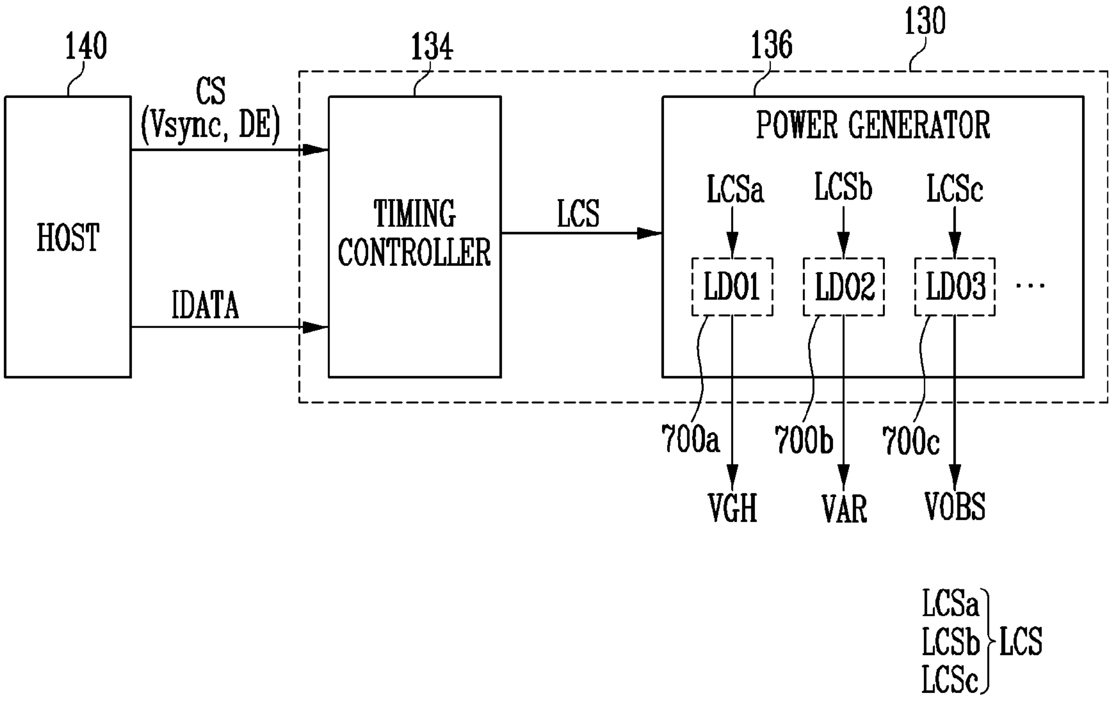
FIG. 9 is an embodiment of generating a regulator control signal.

FIG. 9 is an embodiment illustrating generating the regulator control signal LCS.

Referring to FIG. 9, the host 140 may output the control signal CS and the input image data IDATA.

According to an embodiment, the control signal CS may include a vertical synchronization signal Vsync and a data enable signal DE. The vertical synchronization signal Vsync may be a signal defining a length of one frame period. The data enable signal DE may be a signal defining each of an active period and a blank period within one frame period. The active period may be a period in which the data signal is supplied to the pixel circuit of each of the plurality of sub-pixels of that pixel circuit. The blank period may be a period in which at least one sub-pixel of a pixel circuit maintains a turn-off state in the pixel circuit of each of the plurality of sub-pixels. According to an embodiment, the control signal CS may include information on the driving frequency (or frame rate). In the above-described embodiment, the timing controller 134 may generate the vertical synchronization signal Vsync and the data enable signal DE based on the received information on the driving frequency. The timing controller 134 may output the regulator control signal LCS based on the received information on the driving frequency (or frame rate) (or the generated vertical synchronization signal Vsync and data enable signal DE). In the following description, for convenience of description, an embodiment in which the control signal CS includes Vsync and the data enable signal DE is described as an example, but embodiments of the disclosure are not limited thereto.

The timing controller 134 may receive the control signal CS and the input image data IDATA, and output the regulator control signal LCS based on the received control signal CS. LCS may include a first regulator control signal LCSa, a second regulator control signal LCSb, a third regulator control signal LCSc, and the like. LCS may have different respective values in the active period and the blank period.

The power generator 136 may receive the regulator control signal LCS, and each of a plurality of regulators outputs a constant voltage corresponding to LCS. For example, a first regulator 700*a* may output the high level voltage VGH in response to the first regulator control signal LCSa. A second regulator 700*b* may generate the third power voltage VAR in response to the second regulator control signal LCSb. A third regulator 700*c* may output the fourth power voltage VOBS in response to the third regulator control signal LCSc.

Each of the first to third regulators 700*a* to 700*c* may be examples of the regulator 700 described above with reference to FIG. 7. For example, the current source circuit 710 of the first regulator 700*a* may be controlled by the first regulator control signal LCSa. The current source circuit 710 of the second regulator 700*b* may be controlled by the second regulator control signal LCSb. The current source circuit 710 of the third regulator 700*c* may be controlled by the third regulator control signal LCSc.

Figure 10:
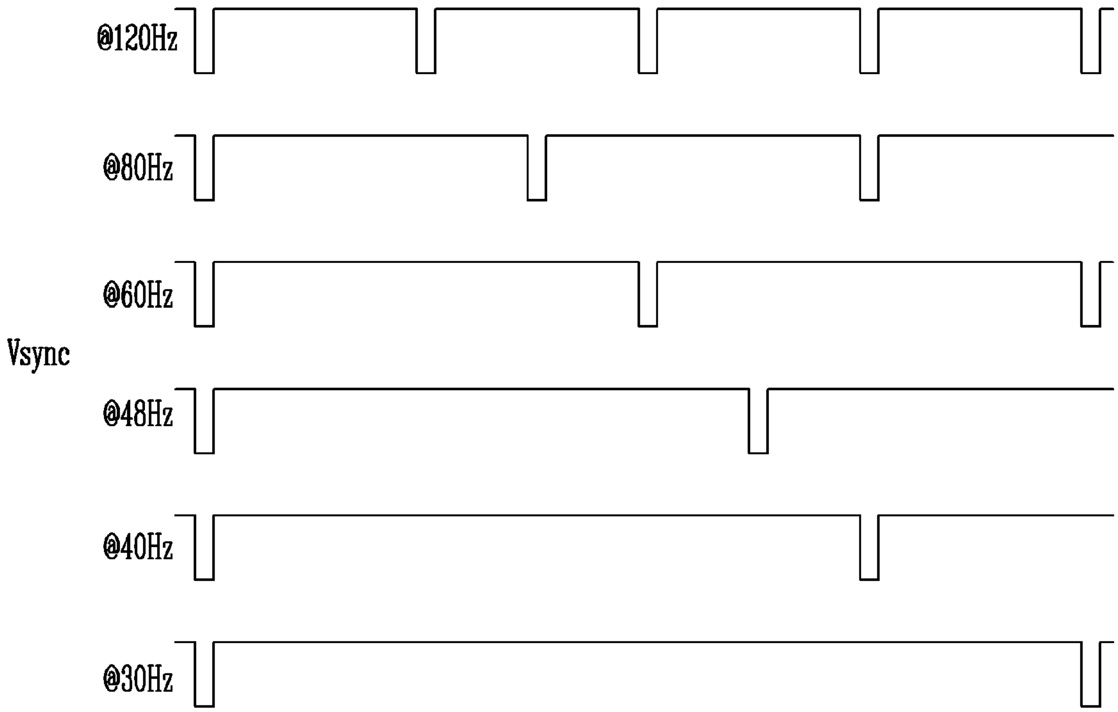
FIG. 10 is a diagram illustrating vertical synchronization signals of various frequencies.

FIG. 10 is a diagram illustrating vertical synchronization signals Vsync of various frequencies.

Referring to FIG. 10, the vertical synchronization signal Vsync may have various frequencies ("Vsync frequencies"). For example, as illustrated, the Vsync frequency (sometimes called a driving frequency) may be 120 Hz, 80 Hz, 60 Hz, 48 Hz, 40 Hz, 30 Hz, and the like. In other examples, the Vsync frequency may be 24 Hz, 20 Hz, 15 Hz, 12 Hz, 10 Hz, 8 Hz, 6 Hz, 5 Hz, 4 Hz, 3 Hz, 2 Hz, 1 Hz, and the like. In still other examples, the Vsync frequency may be greater than 120 Hz or less than 1 Hz.

The Vsync frequency corresponds to a frequency at which an image displayed on the display panel 110 (refer to FIG. 1) is updated ("refreshed"). For example, when the Vsync frequency is relatively high, the frequency at which the image displayed on the display panel 110 is updated is also high, which may result in a smoother image. For example, when the Vsync frequency is low, the frequency at which the image displayed on the display panel 110 is updated is also low. Accordingly, power consumption of the display device 100 (refer to FIG. 1) may be reduced.

Figure 11A:
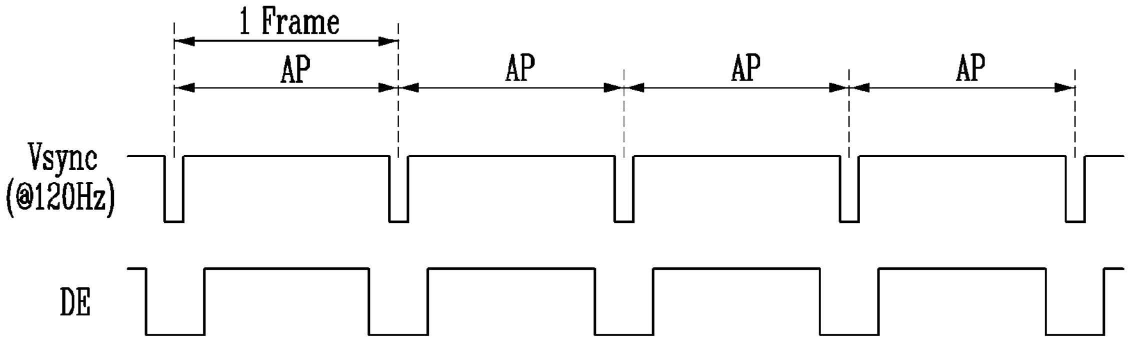
FIGS. 11A and 11B are diagrams illustrating the vertical synchronization signal and a data enable signal.
Figure 11B:
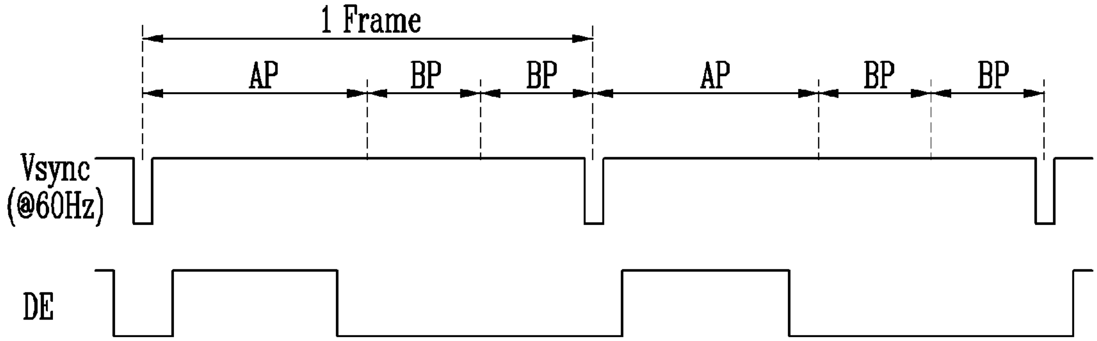

FIGS. 11A and 11B are diagrams illustrating the vertical synchronization signal Vsync and the data enable signal DE.

The vertical synchronization signal Vsync may define a length of one frame period, and the data enable signal DE may define a length of an active period AP and a blank period BP within one frame period. For example, a length of a period in which Vsync has a high logic level may correspond to (or similar to) the length of one frame period. For example, within one frame period, a period in which the data enable signal DE has a high logic level may correspond to (or similar to) the active period AP, and a period in which the data enable signal DE has a low logic level may correspond to one or more blank periods BP.

Referring to FIG. 11A, an embodiment in which the Vsync frequency is 120 Hz is shown. A period in which Vsync has a high logic level corresponds to a period in which the data enable signal DE has a high logic level. In an embodiment in which the Vsync frequency is 120 Hz, one frame period may include only the active period AP.

Referring to FIG. 11B, an embodiment in which the frequency of the vertical synchronization signal Vsync is 60 Hz is shown. A length of a period in which Vsync has a high logic level is longer than a length of a period in which the data enable signal DE has a high logic level. In an embodiment in which the frequency of the vertical synchronization signal Vsync is 60 Hz, one frame period may include one active period AP and one or more blank periods BP.

Referring to FIG. 11B, an embodiment in which the length of the active period AP is longer than the length of the blank period BP is shown. For example, the length of the active period AP may be twice the length of the blank period BP, but embodiments of the disclosure are not limited thereto. For example, the length of the active period AP may be equal to the length of the blank period BP. Alternatively, the length of the active period AP may be longer or shorter than twice the length of the blank period BP. In the following description, for convenience of description, an embodiment in which the length of the active period AP is twice the length of the blank period BP is described as an example, but the embodiments of the disclosure are not limited thereto.

Figure 12:
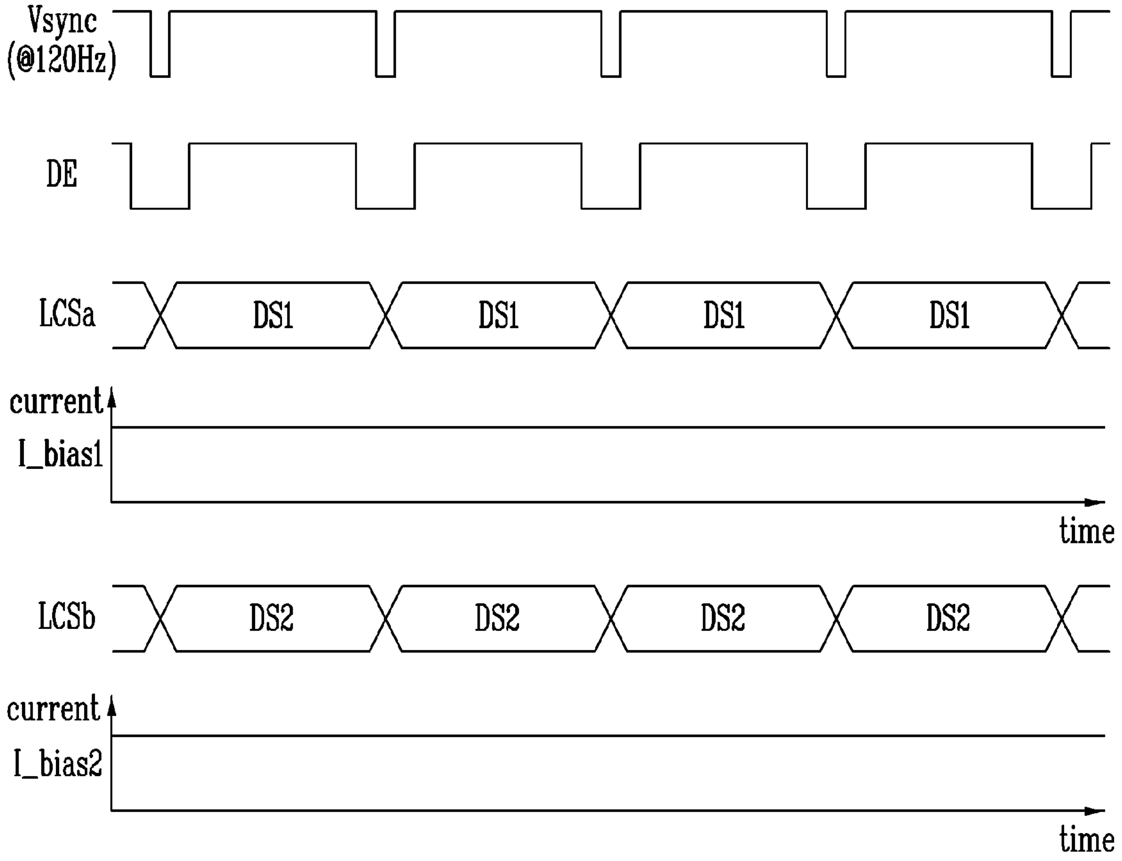
FIG. 12 is an embodiment of the regulator control signals output in response to a vertical synchronization signal of 120 Hz.

FIG. 12 is an embodiment of the regulator control signals LCSa and LCSb output in response to the vertical synchronization signal Vsync of 120 Hz.

Referring to FIG. 12, the data enable signal DE has a high logic level in correspondence with a period in which the vertical synchronization signal Vsync has a high logic level. Referring to FIG. 11A above, each frame period may include only the active period AP.

The first regulator control signal LCSa may have a first digital signal value DS1 in the active period. The second regulator control signal LCSb may have a second digital signal value DS2 in the active period.

Further referring to FIGS. 8A and 8B, the first digital signal value DS1 may be a value that controls the current driving capability of the current source circuit 710 to increase relatively. For example, the first digital signal value DS1 may be a value that controls all of the plurality of switching elements 830 to be turned on. Accordingly, the display quality may be maintained high by precisely controlling a gate voltage (for example, high level voltage) by increasing the current driving capability in the active period.

Further referring to FIGS. 8A and 8B, the second digital signal value DS2 may be a value that controls the current driving capability of the current source circuit 710 to increase relatively. For example, the second digital signal value DS2 may be a value that controls all of the plurality of switching elements 830 to be turned on. Accordingly, the display quality may be maintained high by precisely controlling a power voltage (for example, the third power voltage) by increasing the current driving capability in the active period.

The second digital signal value DS2 may be equal to the first digital signal value DS1. For example, further referring to FIGS. 7 to 9, the plurality of switching elements 830 turned on by the first digital signal value DS1 in the first regulator 700*a* may be substantially equal to the plurality of switching elements 830 turned on by the second digital signal value DS2 in the second regulator 700*b*. However, embodiments of the disclosure are not limited thereto, and the second digital signal value DS2 and the first digital signal value DS1 may be different from each other.

Referring to FIG. 12, a first bias current I_bias1 corresponding to the first regulator control signal LCSa and a second bias current I_bias2 corresponding to the second regulator control signal LCSb are shown. Further referring to FIG. 9, the first bias current I_bias1 may correspond to, for example, a bias current flowing through the first regulator 700*a* generating the high level voltage VGH. The second bias current I_bias2 may correspond to, for example, a bias current flowing through the second regulator 700*b* generating the third power voltage VAR.

A magnitude of the first bias current I_bias1 may be controlled based on the first regulator control signal LCSa. For example, in response to the first regulator control signal LCSa of the first digital signal value DS1, a first bias current I_bias1 of a magnitude corresponding thereto may flow through the first regulator 700*a* (refer to FIG. 9).

A magnitude of the second bias current I_bias2 may be controlled based on the second regulator control signal LCSb. For example, in response to the second regulator control signal LCSb of the second digital signal value DS2, a second bias current I_bias2 of a magnitude corresponding thereto may flow through the second regulator 700*b* (refer to FIG. 9).

The first bias current I_bias1 of the magnitude corresponding to the first digital signal value DS1 may have a relatively high value. The second bias current I_bias2 of the magnitude corresponding to the second digital signal value DS2 may have a relatively high value.

Figure 13:
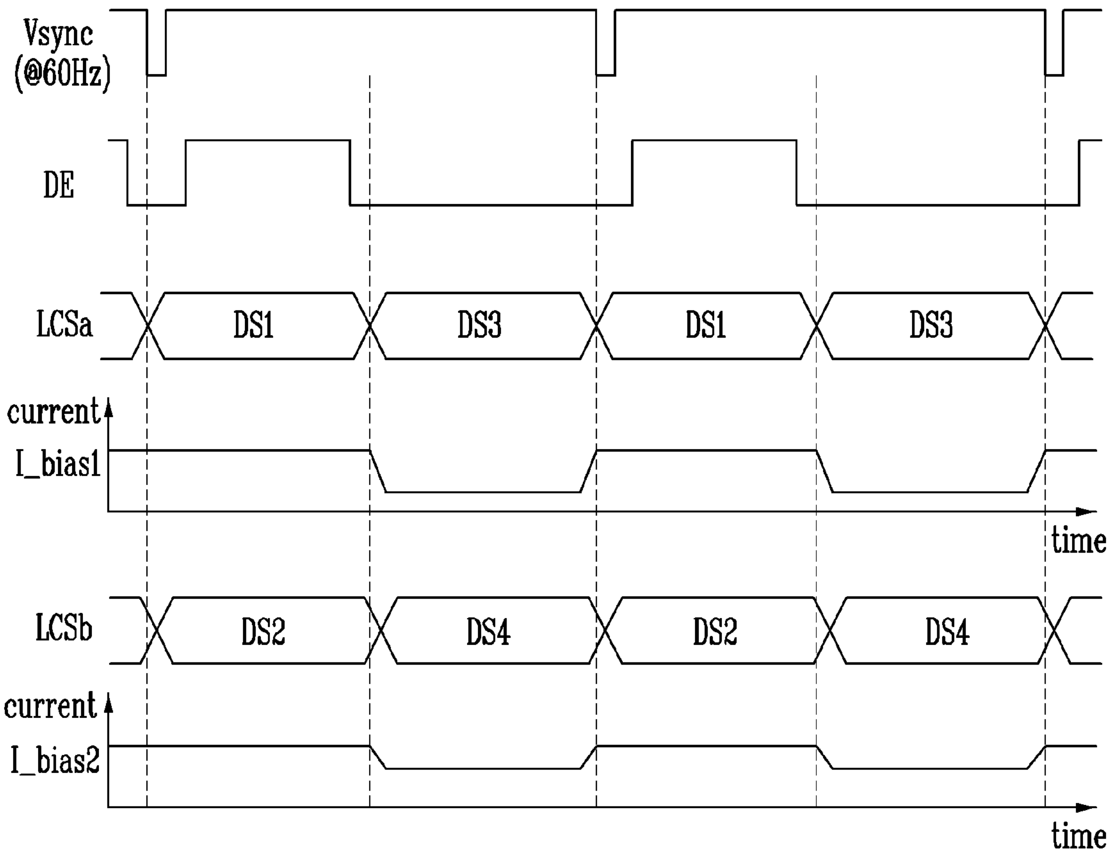
FIG. 13 is an embodiment of the regulator control signals output in response to a vertical synchronization signal of 60 Hz.

FIG. 13 is an embodiment of the regulator control signals LCSa and LCSb output in response to the vertical synchronization signal Vsync of 60 Hz.

Referring to FIG. 13, in at least partial period of a period in which the vertical synchronization signal Vsync has a high logic level, the data enable signal DE may have a high logic level. During a remaining partial period of the period in which the vertical synchronization signal Vsync has the high logic level, the data enable signal DE may have a low logic level. Referring to FIG. 11B above, each frame period may include one active period and one or more blank periods.

The first regulator control signal LCSa may have the first digital signal value DS1 in the active period. The second regulator control signal LCSb may have the second digital signal value DS2 in the active period.

The first regulator control signal LCSa may have a third digital signal value DS3 in the blank period. The second regulator control signal LCSb may have a fourth digital signal value DS4 in the blank period.

Since a description of the first digital signal value DS1 and the second digital signal value DS2 is described with reference to FIG. 12, the description of these configurations is omitted.

Further referring to FIGS. 8A and 8B, the third digital signal value DS3 may be a value that controls the current driving capability of the current source circuit 710 to be relatively less. For example, the third digital signal value DS3 may be a value that controls at least a portion of the plurality of switching elements 830 to be turned off. Accordingly, power consumption may be maintained relatively low by decreasing a current driving capability in the blank period.

Further referring to FIGS. 8A and 8B, the fourth digital signal value DS4 may be a value that controls the current driving capability of the current source circuit 710 to be relatively less. For example, the fourth digital signal value DS4 may be a value that controls at least a portion of the plurality of switching elements 830 to be turned off. Accordingly, power consumption may be maintained relatively low by decreasing the current driving capability in the blank period.

According to an embodiment, the third digital signal value DS3 may be equal to the fourth digital signal value DS4.

According to an embodiment, the third digital signal value DS3 may be different from the fourth digital signal value DS4. For example, further referring to FIGS. 7 to 9, the plurality of switching elements 830 turned on by the third digital signal value DS3 in the first regulator 700*a* may be different from the plurality of switching elements 830 turned on by the fourth digital signal value DS4 in the second regulator 700*b*. For example, the third digital signal value DS3 may be a value that controls the magnitude of the bias current I_bias to be decreased, in comparison with the fourth digital signal value DS4. Accordingly, the magnitude of the bias current I_bias of the second regulator 700*b* generating the third power voltage VAR may be relatively high in the blank period, and the magnitude of the bias current I_bias of the first regulator 700*a* generating the high level voltage VGH may be relatively low in the blank period.

Referring to the previous drawings entirely, it is sufficient when the gate voltage (for example, the high level voltage VGH, the low level voltage VGL, and the like) is controlled within a range in which the gate voltage may properly turn on or off the pixel transistor (for example, the second to eighth pixel transistors TR2 to TR8), the display quality may be maintained even though the voltage regulation characteristic is relatively decreased during the blank period BP.

On the other hand, a voltage level of a power voltage (for example, the second power voltage VINT, the third power voltage VAR, the fourth power voltage VOBS, and the like) may be required to be controlled within a precise range. Accordingly, maintaining the voltage regulation characteristic relatively high in the blank period BP may be advantageous in terms of maintaining the display quality.

The magnitude of the first bias current I_bias1 may be controlled based on the first regulator control signal LCSa. For example, in response to the first regulator control signal LCSa of the first digital signal value DS1, a first bias current I_bias1 of a magnitude corresponding thereto may flow through the first regulator 700*a* (refer to FIG. 9). For example, in response to the first regulator control signal LCSa of the third digital signal value DS3, a first bias current I_bias1 of a magnitude corresponding thereto may flow through the first regulator 700*a*.

The magnitude of the second bias current I_bias2 may be controlled based on the second regulator control signal LCSb. For example, in response to the second regulator control signal LCSb of the second digital signal value DS2, a second bias current I_bias2 of a magnitude corresponding thereto may flow through the second regulator 700*b* (refer to FIG. 9). For example, in response to the second regulator control signal LCSb of the fourth digital signal value DS4, a second bias current I_bias2 of a magnitude corresponding thereto may flow through the second regulator 700*b*.

The first bias current I_bias1 of the magnitude corresponding to the first digital signal value DS1 may have a relatively high value. The first bias current I_bias1 of the magnitude corresponding to the third digital signal value DS3 may be relatively less than the first bias current I_bias1 of the magnitude corresponding to the first digital signal value DS1. Accordingly, the magnitude of the bias current during the blank period may be controlled to be relatively less than that during the active period.

The second bias current I_bias2 of the magnitude corresponding to the second digital signal value DS2 may have a relatively high value. The second bias current I_bias2 of the magnitude corresponding to the fourth digital signal value DS4 may be relatively less than the second bias current I_bias2 of the magnitude corresponding to the second digital signal value DS2. Accordingly, the magnitude of the bias current during the blank period may be controlled to be relatively less than that during the active period.

The second bias current I_bias2 of the magnitude corresponding to the fourth digital signal value DS4 may be relatively greater than the first bias current I_bias1 of the magnitude corresponding to the third digital signal value DS3. Accordingly, during the blank period, the gate voltage (for example, the high level voltage VGH, the low level voltage VGL, and the like) may control the voltage regulation characteristic to be relatively low, and the power voltage (for example, the second power voltage VINT, the third power voltage VAR, the fourth power voltage VOBS, and the like) may control the voltage regulation characteristic to be relatively high.

Figure 14:
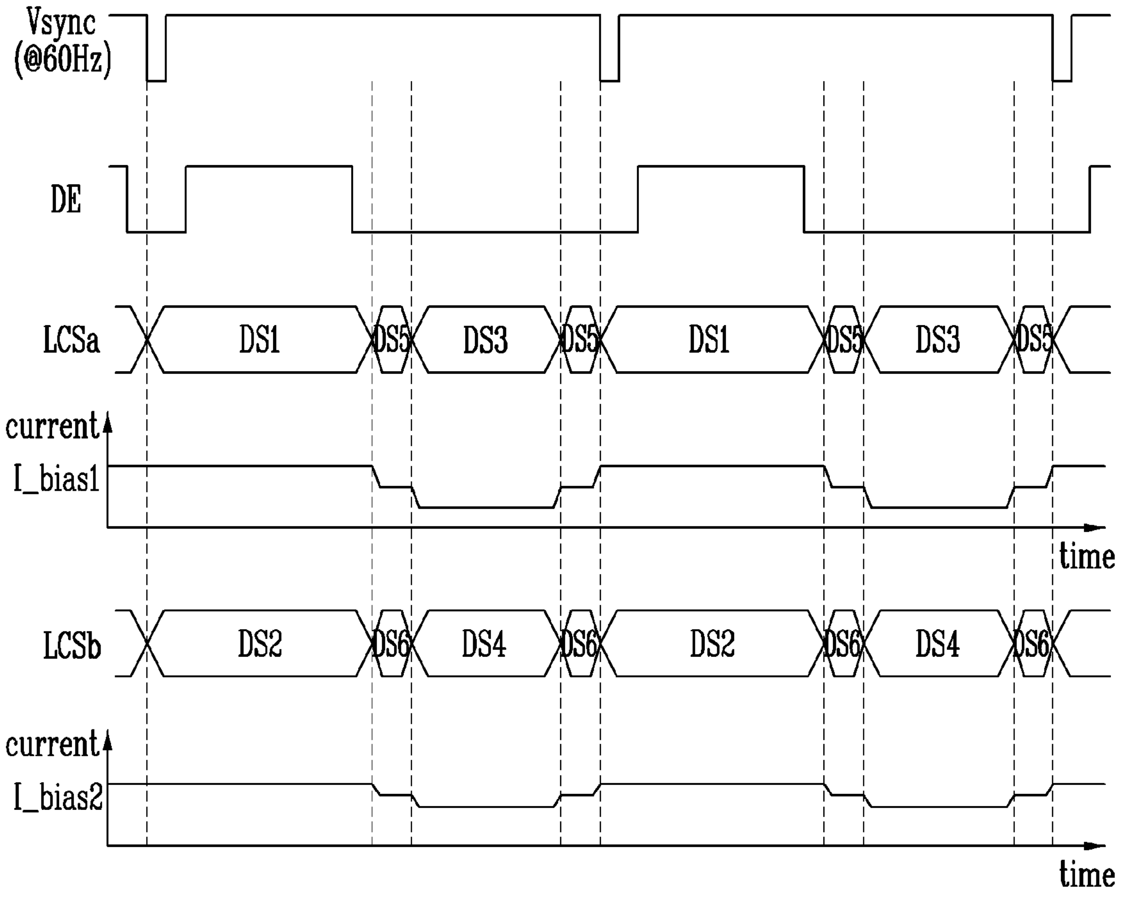
FIG. 14 is another embodiment of regulator control signals output in response to the vertical synchronization signal of 60 Hz.

FIG. 14 is another embodiment of regulator control signals LCSa and LCSb output in response to the vertical synchronization signal Vsync of 60 Hz.

Referring to FIG. 14, in at least partial period of a period in which the vertical synchronization signal Vsync has a high logic level, the data enable signal DE has a high logic level. In a remaining partial period of the period in which the vertical synchronization signal Vsync has the high logic level, the data enable signal DE has a low logic level. Referring to FIG. 11B above, each frame period may include one active period and one or more blank periods.

The first regulator control signal LCSa may have the first digital signal value DS1 in the active period. The second regulator control signal LCSb may have the second digital signal value DS2 in the active period.

The first regulator control signal LCSa may have the third digital signal value DS3 in the blank period. The second regulator control signal LCSb may have the fourth digital signal value DS4 in the blank period.

The first regulator control signal LCSa may have a fifth digital signal value DS5 in the blank period. The second regulator control signal LCSb may have a sixth digital signal value DS6 in the blank period.

Since a description of the first digital signal value DS1 and the second digital signal value DS2 is described with reference to FIG. 12, the description of these configurations is omitted. Since the third digital signal value DS3 and the fourth digital signal value DS4 were described above with reference to FIG. 13, redundant description thereof is omitted.

Further referring to FIGS. 8A and 8B, the fifth digital signal value DS5 may be a value that controls the current driving capability of the current source circuit 710 to be relatively less in comparison with the first digital signal value DS1. The fifth digital signal value DS5 may be a value that controls the current driving capability of the current source circuit 710 to be relatively higher than the third digital signal value DS3. Accordingly, a phenomenon that the voltage regulation characteristic rapidly changes when switching from the active period to the blank period and/or from the blank period to the active period may be alleviated.

Further referring to FIGS. 8A and 8B, the sixth digital signal value DS6 may be a value that controls the current driving capability of the current source circuit 710 to be relatively less in comparison with the second digital signal value DS2. The sixth digital signal value DS6 may be a value that controls the current driving capability of the current source circuit 710 to be relatively higher than the fourth digital signal value DS4. Accordingly, a phenomenon that the voltage regulation characteristic rapidly changes when switching from the active period to the blank period and/or from the blank period to the active period may be alleviated.

According to an embodiment, the fifth digital signal value DS5 may be equal to the sixth digital signal value DS6. According to an embodiment, the fifth digital signal value DS5 may be different from the sixth digital signal value DS6.

The fifth digital signal value DS5 may be output after an output of the first digital signal value DS1 is ended. The third digital signal value DS3 may be output after an output of the fifth digital signal value DS5 is ended.

The sixth digital signal value DS6 may be output after an output of the second digital signal value DS2 is ended. The fourth digital signal value DS4 may be output after an output of the sixth digital signal value DS6 is ended.

The magnitude of the first bias current I_bias1 may be controlled based on the first regulator control signal LCSa. For example, in response to the first regulator control signal LCSa of the first digital signal value DS1, a first bias current I_bias1 of a magnitude corresponding thereto may flow through the first regulator 700*a* (refer to FIG. 9). For example, in response to the first regulator control signal LCSa of the third digital signal value DS3, a first bias current I_bias1 of a magnitude corresponding thereto may flow through the first regulator 700*a*. For example, in response to the first regulator control signal LCSa of the fifth digital signal value DS5, a first bias current I_bias1 of a magnitude corresponding thereto may flow through the first regulator 700*a*.

The magnitude of the second bias current I_bias2 may be controlled based on the second regulator control signal LCSb. For example, in response to the second regulator control signal LCSb of the second digital signal value DS2, a second bias current I_bias2 of a magnitude corresponding thereto may flow through the second regulator 700*b* (refer to FIG. 9). For example, in response to the second regulator control signal LCSb of the fourth digital signal value DS4, the second bias current I_bias2 of a magnitude corresponding thereto may flow through the second regulator 700*b*. For example, in response to the second regulator control signal LCSb of the sixth digital signal value DS6, a second bias current I_bias2 of a magnitude corresponding thereto may flow through the second regulator 700*b*.

The first bias current I_bias1 of the magnitude corresponding to the first digital signal value DS1 may have a relatively high value. The first bias current I_bias1 of the magnitude corresponding to the third digital signal value DS3 may be lower than the first bias current I_bias1 of the magnitude corresponding to the first digital signal value DS1. The first bias current I_bias1 of the magnitude corresponding to the fifth digital signal value DS5 may be lower than the first bias current I_bias1 of the magnitude corresponding to the first digital signal value DS1. The first bias current I_bias1 of the magnitude corresponding to the fifth digital signal value DS5 may be higher than the first bias current I_bias1 of the magnitude corresponding to the third digital signal value DS3. Accordingly, the magnitude of the first bias current I_bias1 may be sequentially decreased or increased during the blank period. Therefore, as the voltage regulation characteristic of the first regulator 700*a* (refer to FIG. 9) may be sequentially decreased or increased, a sudden degradation in the display quality may be reduced or prevented.

The second bias current I_bias2 of the magnitude corresponding to the second digital signal value DS2 may have a relatively high value. The second bias current I_bias2 of the magnitude corresponding to the fourth digital signal value DS4 may be relatively less than the second bias current I_bias2 of the magnitude corresponding to the second digital signal value DS2. The second bias current I_bias2 of the magnitude corresponding to the sixth digital signal value DS6 may be relatively less than the second bias current I_bias2 of the magnitude corresponding to the second digital signal value DS2. The second bias current I_bias2 of the magnitude corresponding to the sixth digital signal value DS6 may be higher than the second bias current I_bias2 of the magnitude corresponding to the fourth digital signal value DS4. Accordingly, the magnitude of the second bias current I_bias2 may be sequentially decreased or increased during the blank period. Therefore, as the voltage regulation characteristic of the second regulator 700*b* (refer to FIG. 9) may be sequentially decreased or increased, a sudden degradation in the display quality may be reduced or prevented.

Figure 15:
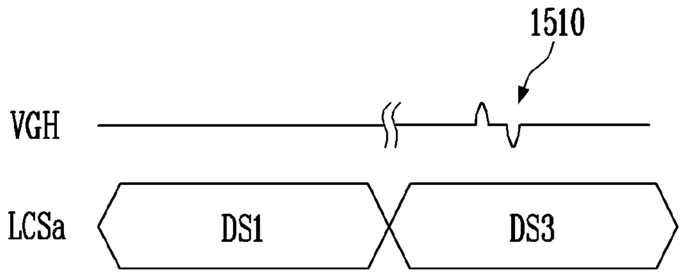
FIG. 15 is a diagram illustrating that a voltage level of a gate signal is controlled in response to a first regulator control signal.

FIG. 15 is a diagram illustrating that a voltage level of the gate signal is controlled in response to the first regulator control signal LCSa.

Referring to FIG. 15, an embodiment in which the voltage regulation characteristic of the gate signal (for example, the high level voltage VGH) is controlled by the first regulator control signal LCSa is shown.

By the first regulator control signal LCSa having the first digital signal value DS1, the voltage regulation characteristic of the high level voltage VGH may be controlled to be relatively high.

By the first regulator control signal LCSa having the third digital signal value DS3, the voltage regulation characteristic of the high level voltage VGH may be controlled to be relatively less. For example, the high level voltage VGH may include a ripple voltage 1510. Due to the ripple voltage 1510, the voltage level of the high level voltage VGH may be temporarily changed.

Figure 16:
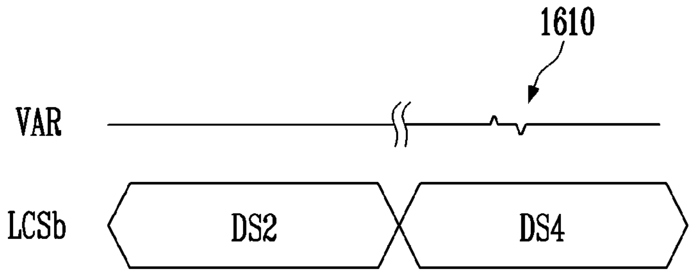
FIG. 16 is a diagram illustrating that a level of a power voltage is controlled in response to a second regulator control signal.

FIG. 16 is a diagram illustrating that a level of the power voltage may be controlled in response to the second regulator control signal LCSb.

Referring to FIG. 16, an embodiment in which the voltage regulation characteristic of the power voltage (for example, the third power voltage VAR) is controlled by the second regulator control signal LCSb is shown.

By the second regulator control signal LCSb having the second digital signal value DS2, the voltage regulation characteristic of the third power voltage VAR may be controlled to be relatively high.

By the second regulator control signal LCSb having the fourth digital signal value DS4, the voltage regulation characteristic of the third power voltage VAR may be controlled to be relatively low. For example, the third power voltage VAR may include a ripple voltage 1610. Due to the ripple voltage 1610, the voltage level of the third power voltage VAR may be temporarily changed.

Further referring to FIG. 15, a width in which the voltage level of the third power voltage VAR is changed due to the ripple voltage 1610 may be less than a width in which the voltage level of the high level voltage VGH is changed due to the ripple voltage 1510. This may be because the fourth digital signal value DS4 is a value that controls the current driving capability of the regulator 700 (refer to FIG. 7) greater in comparison with the third digital signal value DS3.

Figure 17:
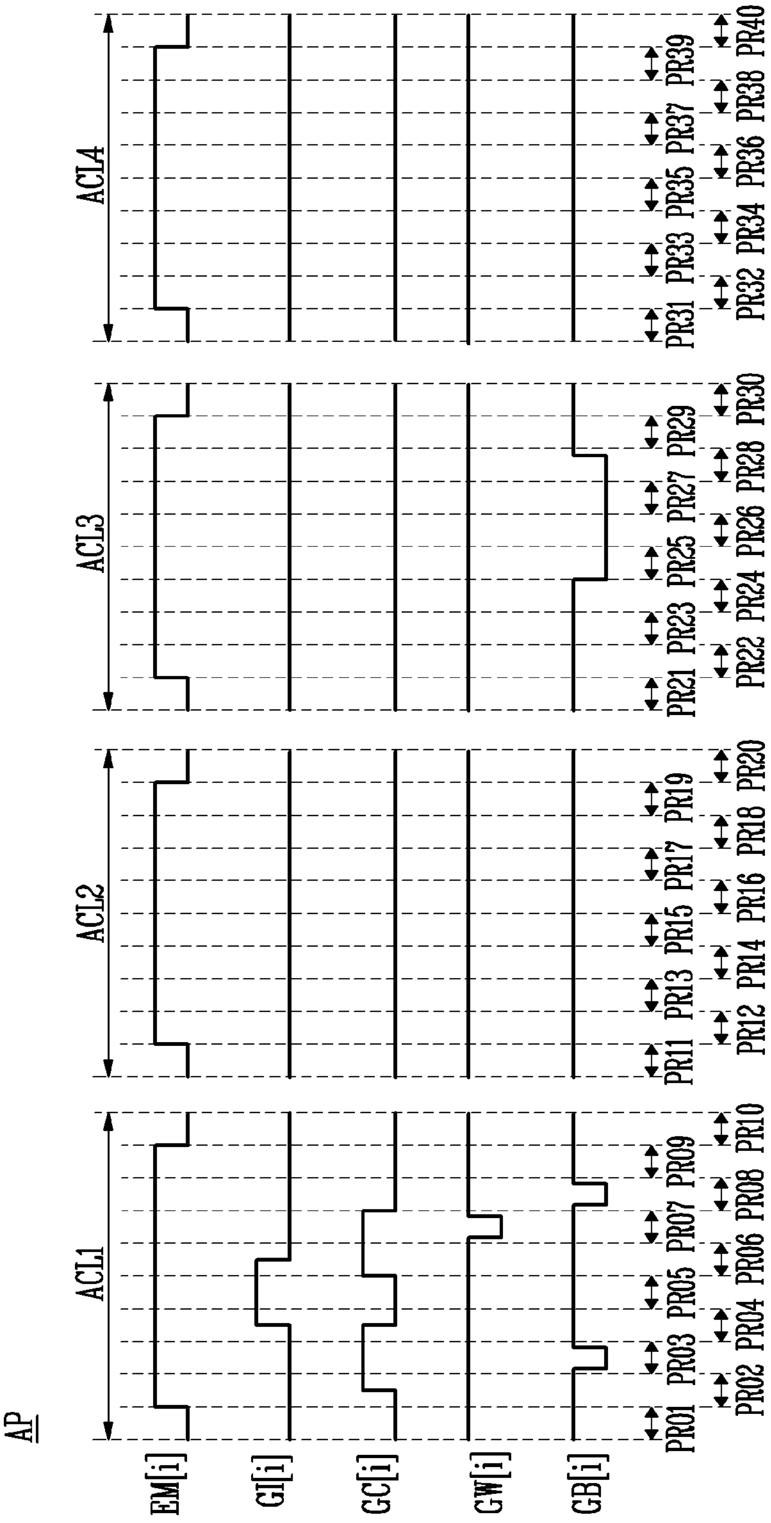
FIG. 17 is an example of a timing diagram of the gate signals input to the sub-pixel of FIG. 4 during an active period for an operation of FIGS. 11A to 14.

FIG. 17 is an example of a timing diagram of the gate signals GW, GC, GI, GB, and EM input to the sub-pixel SPX of FIG. 4 during the active period AP for an operation of FIGS. 11A to 14.

Referring to FIG. 17, the active period AP may include one or more active cycles. For example, the active period AP may include a first active cycle ACL1, a second active cycle ACL2, a third active cycle ACL3, and a fourth active cycle ACL4. The first to fourth active cycles ACL1 to ACL4 may be sequentially followed. According to an embodiment, a predetermined period may be included between respective active cycles.

Each of the first to fourth active cycles ACL1 to ACL4 may have the same length. For example, referring to FIG. 17, a length of each of the first to fourth active cycles ACL1 to ACL4 may be 10 horizontal periods. One horizontal period may correspond to a length of a period allocated to write the data voltage Vdata (refer to FIG. 4) to the plurality of sub-pixels SPX (refer to FIG. 4) positioned in one pixel row.

In the following description, with further reference to FIG. 4, each cycle and each period are described in detail.

The first active cycle ACL1 may include first to tenth periods PR01 to PR10. A length of each of the first to tenth periods PR01 to PR10 may correspond to one horizontal period.

In the first period PR01, a turn-on level of emission signal EM[i], a turn-off level of third scan signal GI[i], a turn-off level of second scan signal GC[i], a turn-off level of first scan signal GW[i], a turn-off level of fourth scan signal GB[i] are written. The sixth pixel transistor TR6 and the seventh pixel transistor TR7 may be turned on. The fourth transistor TR4 may be turned off. The third pixel transistor TR3 may be turned off. The second transistor TR2 may be turned off. The fifth pixel transistor TR5 and the eighth pixel transistor TR8 may be turned off.

In the second period PR02, a turn-off level of emission signal EM[i], a turn-off level of third scan signal GI[i], a turn-off level of first scan signal GW[i], and a turn-off level of the fourth scan signal GB[i] are written. The second scan signal GC[i] transits from a turn-off level to a turn-on level. The sixth pixel transistor TR6 and the seventh pixel transistor TR7 may be turned off. The fourth pixel transistor TR4 may be turned off. The second pixel transistor TR2 may be turned off. The fifth pixel transistor TR5 and the eighth pixel transistor TR8 may be turned off. The third pixel transistor TR3 may be turned on.

In the third period PR03, a turn-off level of emission signal EM[i], a turn-off level of third scan signal GI[i], a turn-on level of second scan signal GC[i], a turn-off level of first scan signal GW[i], and a turn-on level of fourth scan signal GB[i] are written. The sixth pixel transistor TR6 and the seventh pixel transistor TR7 may be turned off. The fourth pixel transistor TR4 may be turned off. The third pixel transistor TR3 may be turned on. The second pixel transistor TR2 may be turned off. The fifth pixel transistor TR5 and the eighth pixel transistor TR8 may be turned on. In a corresponding period, the second node N2 and the third node N3 may be connected. The third power voltage VAR may be applied to the fourth node N4. The fourth power voltage VOBS may be applied to the first node N1.

In the fourth period PR04, a turn-off level of emission signal EM[i], a turn-off level of first scan signal GW[i], and a turn-off level of fourth scan signal GB[i] are written. The third scan signal GI[i] transits from a turn-off level to a turn-on level. The second scan signal GC[i] transits from a turn-on level to a turn-off level. The sixth pixel transistor TR6 and the seventh pixel transistor TR7 may be turned off. The second pixel transistor TR2 may be turned off. The fifth pixel transistor TR5 and the eighth pixel transistor TR8 may be turned off. The fourth pixel transistor TR4 may be turned on. The third pixel transistor TR3 may be turned off. The second power voltage VINT may be applied to the third node N3. The second power voltage VINT may be a turn-on level voltage of the first pixel transistor TR1.

In the fifth period PR05, a turn-off level of emission signal EM[i], a turn-off level of third scan signal GI[i], a turn-off level of second scan signal GC[i], a turn-off level of first scan signal GW[i], and a turn-off level of fourth scan signal GB[i] are written. The sixth pixel transistor TR6 and the seventh pixel transistor TR7 may be turned off. The fourth pixel transistor TR4 may be turned on. The third pixel transistor TR3 may be turned off. The second pixel transistor TR2 may be turned off. The fifth pixel transistor TR5 and the eighth pixel transistor TR8 may be turned off.

In the sixth period PR06, a turn-off level of emission signal EM[i], a turn-on level of second scan signal GC[i], a turn-off level of first scan signal GW[i], and a turn-off level of fourth scan signal GB[i] are written. The third scan signal GC[i] transits from a turn-on level to a turn-off level. The sixth pixel transistor TR6 and the seventh pixel transistor TR7 may be turned off. The third pixel transistor TR3 may be turned on. The second pixel transistor TR2 may be turned off. The fifth pixel transistor TR5 and the eighth pixel transistor TR8 may be turned off. The third pixel transistor TR3 may be turned off.

In the seventh period PR07, a turn-off level of emission signal EM[i], a turn-off level of third scan signal GI[i], a turn-on level of second scan signal GC[i], a turn-on level of first scan signal GW[i], and a turn-off level of fourth scan signal GB[i] are written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned on. The fifth pixel transistor TR5 and the eighth pixel transistor TR8 may be turned off. In a corresponding period, the data voltage Vdata or a voltage corresponding thereto may be applied to the first node N1.

In the eighth period PR08, a turn-off level of emission signal EM[i], a turn-off level of third scan signal GI[i], a turn-off level of second scan signal GC[i], a turn-off level of first scan signal GW[i], and a turn-on level of fourth scan signal GB[i] are written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned on.

In the ninth period PR09, a turn-off level of emission signal EM[i], a turn-off level of third scan signal GI[i], a turn-off level of second scan signal GC[i], a turn-off level of first scan signal GW[i], and a turn-off level of fourth scan signal GB[i] are written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off.

In the tenth period PR10, a turn-on level of emission signal EM[i], a turn-off level of third scan signal GI[i], a turn-off level of second scan signal GC[i], a turn-off level of first scan signal GW[i], and a turn-off level of fourth scan signal GB[i] are written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with a luminance corresponding to the written data voltage Vdata.

The second active cycle ACL2 may include eleventh to twentieth periods PR11 to PR20. Each of the eleventh to twentieth periods PR11 to PR20 may correspond to one horizontal period.

In the eleventh period PR11, a turn-on level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with a luminance corresponding to the data voltage Vdata written in the first active cycle ACL1.

In the twelfth to nineteenth periods PR12 to PR19, a turn-off level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off.

In the twentieth period PR20, a turn-on level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with the luminance corresponding to the data voltage Vdata written in the first active cycle ACL1.

The third active cycle ACL3 may include twenty-first to thirtieth periods PR21 to PR30. A length of each of the twenty-first to thirtieth periods PR21 to PR30 may correspond to one horizontal period.

In the twenty-first period PR21, a turn-on level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with the luminance corresponding to the data voltage Vdata written in the first active cycle ACL1.

In the twenty-second to twenty-fourth periods PR22 to PR24, a turn-off level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off.

In the twenty-fifth to twenty-eighth periods PR25 to PR28, a turn-off level of emission signal EM[i], a turn-off level of third scan signal GI[i], a turn-off level of second scan signal GC[i], a turn-off level of first scan signal GW[i], and a turn-on level of fourth scan signal GB[i] may be written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned on. In a corresponding period, the third power voltage VAR may be applied to the fourth node N4. The fourth power voltage VOBS may be applied to the first node N1. Accordingly, the third power voltage VAR may be applied to the first electrode AE of the light emitting element LE, and thus a change in a characteristic value of the light emitting element LE may be alleviated (or compensated). The fourth power voltage VOBS may be applied to the first pixel transistor TR1, and thus a change in a characteristic value of the first pixel transistor TR1 may be alleviated (for example, compensated).

In the twenty-ninth period PR29, a turn-off level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off.

In the thirtieth period PR30, a turn-on level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with the luminance corresponding to the data voltage Vdata written in the first active cycle ACL1.

The fourth active cycle ACL4 may include thirty-first to fortieth periods PR31 to PR40. A length of each of the thirty-first to fortieth periods PR31 to PR40 may correspond to one horizontal period.

In the thirty-first period PR31, a turn-on level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with the luminance corresponding to the data voltage Vdata written in the first active cycle ACL1.

In the thirty-second to thirty-ninth periods PR32 to PR39, a turn-off level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off.

In the fortieth period PR40, a turn-on level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with the luminance corresponding to the data voltage Vdata written in the first active cycle ACL1.

Figure 18:
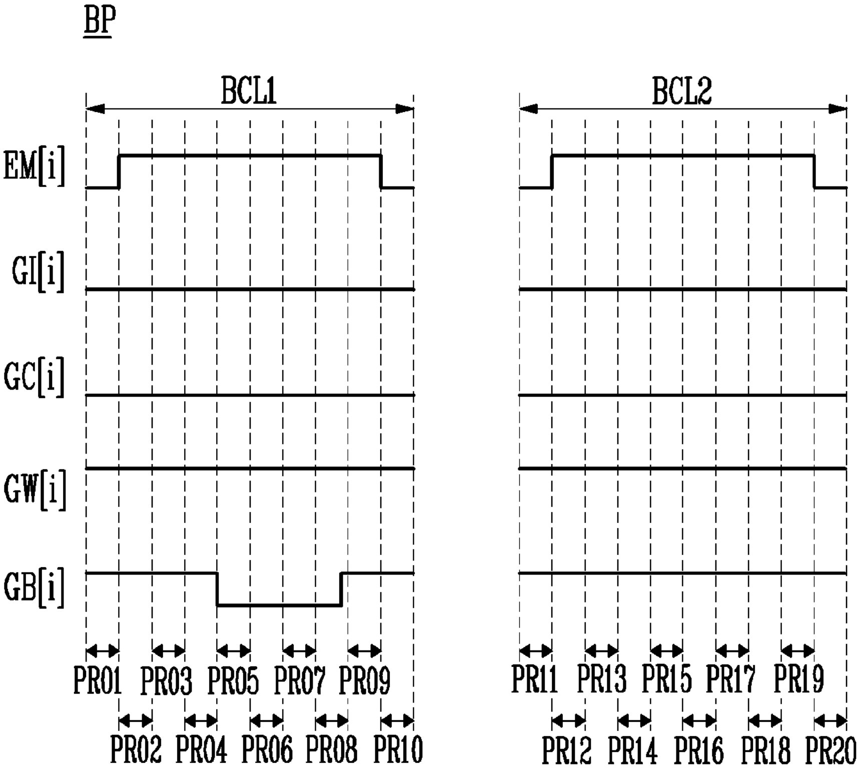
FIG. 18 is an example of a timing diagram of the gate signals input to the sub-pixel of FIG. 4 during a blank period for the operations of FIGS. 11A to 14.

FIG. 18 is an example of a timing diagram of the gate signals GW, GC, GI, GB, and EM input to the sub-pixel SPX of FIG. 4 during the blank period BP for the operations of FIGS. 11A to 14.

Referring to FIG. 18, the blank period BP may include one or more blank cycles. For example, the blank period BP may include a first blank cycle BCL1 and a second blank cycle BCL2. The first and second blank cycles BCL1 and BCL2 may be sequentially followed. According to an embodiment, a predetermined period may be included between respective blank cycles.

In the following description, with further reference to FIG. 4, each cycle and each period are described in detail.

The first blank cycle BCL1 may include first to tenth periods PR01 to PR10. A length of each of the first to tenth periods PR01 to PR10 may correspond to one horizontal period.

In the first period PR01, a turn-on level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with the luminance corresponding to the data voltage Vdata written in the first active cycle ACL1 (refer to FIG. 17) described above.

In the second to fourth periods PR02 to PR04, a turn-off level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off.

In the fifth to eighth periods PR05 to PR08, a turn-off level of emission signal EM[i], a turn-off level of third scan signal GI[i], a turn-off level of second scan signal GC[i], a turn-off level of first scan signal GW[i], and a turn-on level of fourth scan signal GB[i] may be written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned on. In a corresponding period, the third power voltage VAR may be applied to the fourth node N4. The fourth power voltage VOBS may be applied to the first node N1. Accordingly, the third power voltage VAR may be applied to the first electrode AE of the light emitting element LE, and thus a change in the characteristic value of the light emitting element LE may be alleviated (or compensated). The fourth power voltage VOBS may be applied to the first pixel transistor TR1, and thus a change in the characteristic value of the first pixel transistor TR1 may be alleviated (for example, compensated).

In the ninth period PR09, a turn-off level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off.

In the tenth period PR10, a turn-on level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with the luminance corresponding to the data voltage Vdata written in the first active cycle ACL1 (refer to FIG. 17) described above.

The second blank cycle BCL2 may include eleventh to twentieth periods PR11 to PR20. A length of each of the eleventh to twentieth periods PR11 to PR20 may correspond to one horizontal period.

In the eleventh period PR11, a turn-on level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with the luminance corresponding to the data voltage Vdata written in the first active cycle ACL1 (refer to FIG. 17) described above.

In the twelfth to nineteenth periods PR12 to PR19, a turn-off level of emission signal EM[i], a turn-off level of third scan signal GI[i], a turn-off level of second scan signal GC[i], a turn-off level of first scan signal GW[i], and a turn-on level of fourth scan signal GB[i] may be written. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off.

In the twentieth period PR20, a turn-on level of emission signal EM[i], a turn-off level of third scan signal GI[i], a turn-off level of second scan signal GC[i], a turn-off level of first scan signal GW[i], and a turn-off level of fourth scan signal GB[i] may be written. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In a corresponding period, the light emitting element LE may emit light with the luminance corresponding to the data voltage Vdata written in the first active cycle ACL1 (refer to FIG. 17) described above.

Figures 19, 20:
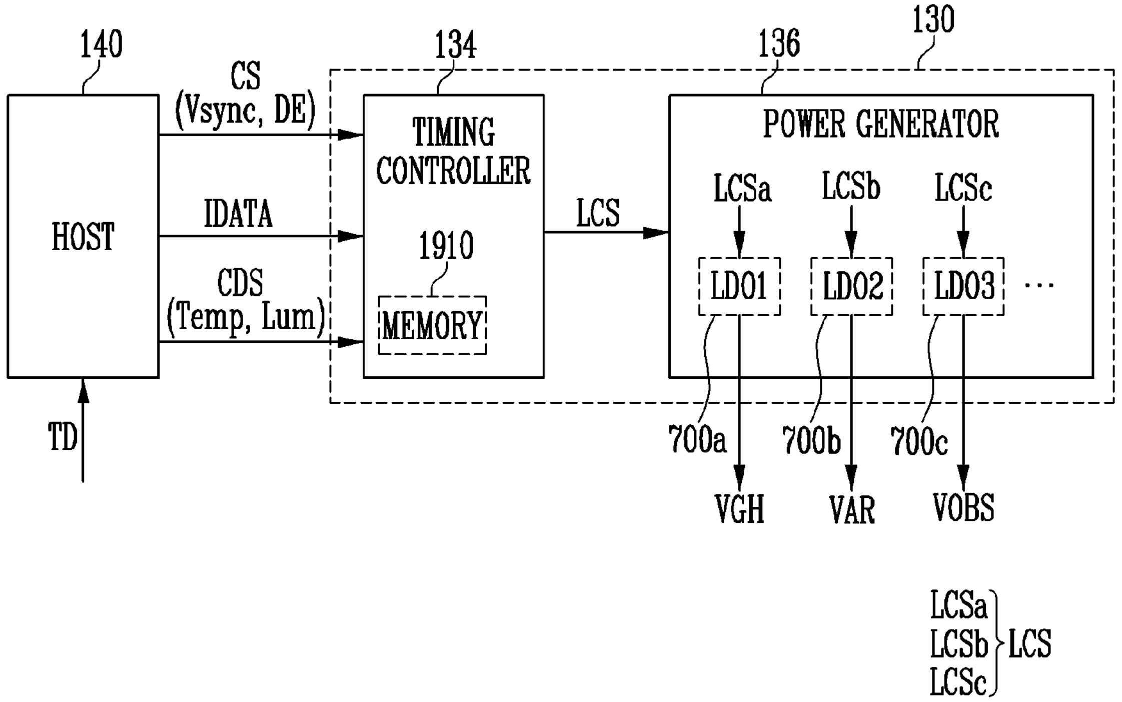
FIG. 19 is another embodiment of generating the regulator control signal.
FIG. 20 is an example of a first lookup table including temperature values, luminance values, and digital signal values according to a combination thereof.

FIG. 19 is another embodiment of generating the regulator control signal LCS.

Referring to FIG. 19, the host 140 may output the control signal CS and the input image data IDATA. Since the control signal CS and the input image data IDATA are described with reference to FIG. 9, a description of these configurations is omitted.

The host 140 may output a condition signal CDS. For example, the host 140 may receive temperature data TD from a temperature sensor (not shown) and output temperature information Temp corresponding to the received temperature data TD as the condition signal CDS. For example, the host 140 may generate luminance information Lum corresponding to a luminance of the input image data IDATA and output the generated luminance information Lum as the condition signal CDS. The timing controller 134 may receive the control signal CS and the input image data IDATA, and output the regulator control signal LCS based on the received control signal CS.

The timing controller 134 may receive the condition signal CDS, and output the regulator control signal LCS having a digital signal value corresponding to the condition signal CDS by referring to a lookup table stored in a memory 1910. Regulator control signals LCSa to LCSc having the digital signal value corresponding to the condition signal CDS may be input to the first to third regulators 700*a* to 700*c*.

Referring to FIG. 19, the memory 1910 is included in the timing controller 134, but embodiments of the disclosure are not limited thereto. For example, the memory 1910 may be separated from the timing controller 134 and disposed in the panel driving circuit 130.

FIG. 20 is an example of a first lookup table LUT1 including temperature values, luminance values, and digital signal values according to a combination thereof.

Referring to FIG. 20, the first lookup table LUT1 may include the temperature information Temp, the luminance information Lum, and the digital signal values corresponding thereto. The first lookup table LUT1 may be used to determine the digital signal value of the regulator control signal LCS in the active period AP.

Two or more temperature values are exemplarily presented as the temperature information Temp. For example, the first lookup table LUT1 may include temperature values of −25° C., 25° C., and 50° C. 25° C. may correspond to a room temperature condition. −25° C. may correspond to a low temperature condition. 50° C. may correspond to a high temperature condition.

As the luminance information Lum, two or more luminance values are exemplarily presented. For example, the first lookup table LUT1 may include luminance values of 1200 nit, 650 nit, 100 nit, and 10 nit.

The digital signal value of the regulator control signal LCS may be determined according to the temperature information Temp and the luminance information Lum. For example, by the temperature value of −25° C. and the luminance value of 1200 nit, the regulator control signal LCS may have a digital signal value of 1110(2) (or corresponding to 14 in decimal). For example, by the luminance value of 25° C. and the luminance value of 100 nit, the regulator control signal LCS may have a digital signal value of 1000(2) (or corresponding to 8 in decimal).

The digital signal value of the regulator control signal LCS may correspond to the current driving capability of the regulator 700 (refer to FIG. 7) controlled by a corresponding regulator control signal. For example, by the regulator control signal LCS having the digital signal value of 1110 (2), the corresponding regulator 700 may have a current driving capability of 14 (for example, a current driving capability corresponding to 0.014 mA). For example, by the regulator control signal LCS having the digital signal value of 1000(2), the corresponding regulator 700 may have a current driving capability of 8 (for example, a current driving capability corresponding to 0.008 mA).

Referring to FIG. 20, the digital signal value of the regulator control signal LCS may have a relatively less value at a room temperature compared to a high temperature or a low temperature. Since performance of the regulator 700 (refer to FIG. 7) may be deteriorated at the high temperature or the low temperature, the voltage regulation characteristic may be stably controlled by strictly controlling the current driving capability of the regulator 700 in a high temperature or low temperature environment.

Referring to FIG. 20, the digital signal value of the regulator control signal LCS may have a relatively less value at a low luminance compared to a high luminance. For example, power consumption may be significantly improved by a magnitude of a current flowing through the display device 100 (refer to FIG. 1) by maintaining a length of one frame period long (for example, decreasing a frequency of the vertical synchronization signal) in an always on display (AOD) mode, decreasing a luminance of an image in the corresponding mode, and controlling the current driving capability of the regulator 700 (refer to FIG. 7) to be low in the corresponding mode.

FIG. 21A is an example of a 2a-th lookup table LUT2*a* including temperature values, luminance values, and digital signal values according to a combination thereof.

Referring to FIG. 21A, the 2a-th lookup table LUT2*a* includes the temperature information Temp, the luminance information Lum, and the digital signal values corresponding thereto. The 2a-th lookup table LUT2*a* may be used to determine the digital signal value of the first regulator control signal LCSa in the blank period BP.

The temperature information Temp and the luminance information Lum are described with reference to FIG. 20. A description of these configurations is omitted.

The digital signal value of the first regulator control signal LCSa may be determined according to the temperature information Temp and the luminance information Lum. For example, by the temperature value of −25° C. and the luminance value of 1200 nit, the first regulator control signal LCSa may have a digital signal value of 0011(2) (or corresponding to 3 in decimal). For example, by the luminance value of 25° C. and the luminance value of 100 nit, the first regulator control signal LCSa may have a digital signal value of 0001(2) (or corresponding to 1 in decimal).

The digital signal value of the first regulator control signal LCSa may correspond to the current driving capability of the first regulator 700*a* (refer to FIG. 19) controlled by the corresponding regulator control signal. For example, by the first regulator control signal LCSa having the digital signal value of 0011(2), the first regulator 700*a* may have a current driving capability corresponding to 3 (for example, a current driving capability corresponding to 0.003 mA). For example, by the first regulator control signal LCSa having the digital signal value of 0001(2), the first regulator 700*a* may have a current driving capability corresponding to 1 (for example, a current driving capability corresponding to 0.001 mA).

Referring to FIGS. 20 and 21A, the digital signal value of the first regulator control signal LCSa in the blank period BP may be less than the digital signal value of the first regulator control signal LCSa in the active period AP under the same temperature and the same luminance conditions. The gate voltage (for example, the high level voltage VGH, the low level voltage VGL, and the like) may have a relatively less effect on the display quality even though the voltage regulation characteristic is controlled relatively low in the blank period BP, and thus the corresponding regulator (for example, the first regulator 700*a*) may control the current driving capability to be lower in the blank period BP. Accordingly, power consumption may be further reduced.

FIG. 21B is an example of a 2b-th lookup table LUT2*b* including the temperature values, the luminance values, and digital signal values according to a combination thereof.

Referring to FIG. 21B, the 2b-th lookup table LUT2*b* includes the temperature information Temp, the luminance information Lum and digital signal values corresponding thereto. The 2b-th lookup table LUT2*b* may be used to determine the digital signal value of the second regulator control signal LCSb in the blank period BP.

The temperature information Temp and the luminance information Lum are described with reference to FIG. 20. A description of these configurations is omitted.

The digital signal value of the second regulator control signal LCSb may be determined according to the temperature information Temp and the luminance information Lum. For example, the temperature value of −25° C. and the luminance value of 1200 nit, the second regulator control signal LCSb may have a digital signal value of 1110(2) (or corresponding to 14 in decimal). For example, by the temperature value of 25° C. and the luminance value of 100 nit, the second regulator control signal LCSb may have a digital signal value of 1000(2) (or corresponding to 8 in decimal).

The digital signal value of the second regulator control signal LCSb may correspond to the current driving capability of the second regulator 700*b* (refer to FIG. 19) controlled by the corresponding regulator control signal. For example, by the second regulator control signal LCSb having the digital signal value of 1110(2), the second regulator 700*b* may have a current driving capability corresponding to 14 (for example, a current driving capability corresponding to 0.014 mA. For example, by the second regulator control signal LCSb having the digital signal value of 1000(2), the second regulator 700*b* may have a current driving capability corresponding to 8 (for example, a current driving capability corresponding to 0.008 mA).

Referring to FIGS. 20 and 21B, the digital signal value of the second regulator control signal LCSb in the blank period BP may be equal or similar to the digital signal value of the first regulator control signal LCSa in the active period AP under the same temperature and the same luminance conditions. It may be advantageous to reduce the effect on the display quality by controlling the voltage regulation characteristic of the power voltage (for example, the third power voltage VAR, the fourth power voltage VOBS, and the like) relatively largely in the blank period BP. However, the embodiments of the disclosure are not limited to that described above.

The above-described embodiments of the disclosure described with reference to FIGS. 1 to 21B as a whole are described as follows.

The display device 100 according to embodiments of the disclosure may include the power generator 136 for generating a voltage used to drive the display device 100. The voltage used for driving the display device may include, for example, the gate signal (for example, the high level voltage VGH and the low level voltage VGL), the power voltage (for example, the initialization voltages VINT and VAR, the on-bias voltage VOBS, and the like.

The power generator 136 may include the regulator 152. The regulator 152 may receive a relatively high level of voltage, decrease the level of the input voltage, and output the decreased level of voltage. The regulator 152 may be implemented as, for example, an LDO regulator.

While the display device 100 is driven, the voltage for driving the regulator 152 (for example, the regulator driving power AV, the voltage applied to the inverting input terminal of the OP-AMP, the voltage, voltage applied to the non-inverting input terminal of the OP-AMP, and the like) may be applied to the regulator 152. Accordingly, the bias current I_Bias (for example, the bias current I_bias of the OP-AMP) may flow through the regulator 152. The bias current I_bias may be generated by the bias current generation circuit 810.

In embodiments of the disclosure, the power generator 136 may include the current source circuit 710 connected to the bias current generator circuit 810. The current source circuit 710 may include a plurality of current sources 820 for controlling the magnitude of the bias current I_bias. The plurality of respective current sources 820 may be connected in parallel with each other. The current source circuit 710 may include the plurality of switching elements 830 for controlling the plurality of current sources 820. Each of the plurality of switching elements 830 may be, for example, connected between a corresponding one of the plurality of current sources 820 and the ground GND.

The plurality of switching elements 830 may be controlled by the regulator control signal LCS. At least a portion of the plurality of switching elements 830 may be turned on and at least a portion may be turned off in response to the regulator control signal LCS. When at least a portion of the plurality of switching elements 830 is turned off, the magnitude of the bias current I_bias generated by the bias current generation circuit 810 may be decreased. Accordingly, power consumed by the regulator 152 may be reduced.

The regulator control signal LCS may be different from each other in the active period AP and the blank period BP. For example, the regulator control signal LCS input to the regulator 152 in the active period AP may be a signal for controlling the bias current I_bias relatively large. For example, the regulator control signal LCS input to the regulator 152 in the blank period BP may be a signal for controlling the magnitude of the bias current I_bias to be relatively less. According to this, when the driving frequency of the display device 100 is low (or when the frame rate of the display device 100 is low), the power consumed by the regulator 152 may be further reduced.

Meanwhile, the magnitude of the bias current I_bias of the corresponding regulator 152 may be variously controlled in the blank period BP according to the voltage output from the regulator 152.

For example, the effect on the display quality of the regulator (for example, the first regulator 700*a*) generating the voltage (for example, the high level voltage VGH and the low level voltage VGL) for controlling turn-on and turn-off of the transistor included in the pixel circuit PXC may be relatively less even though the voltage regulation characteristic of the regulator is decreased. Accordingly, the magnitude of the bias current I_bias of the corresponding regulator may be controlled to be relatively less in the blank period BP.

For example, it may be advantageous that the voltage regulator characteristic of the regulator (for example, the second regulator 700*b*), which generates the voltage (for example, the initialization voltages VINT VAR, the on-bias voltage VOBS, and the like) for controlling (for example, maintaining constant) a characteristic value of the circuit element (for example, the transistor, the light emitting element, and the like) included in the pixel circuit PXC, is high in terms of maintaining the display quality. Accordingly, the corresponding regulator may control the magnitude of the bias current I_bias relatively large in the blank period BP.

According to that described above, the magnitude of the bias current I_bias of the regulator 152 may be changed when switching from the active period AP to the blank period BP and/or from the blank period BP to the active period AP. When the magnitude of the bias current I_bias changes rapidly, the change in the display quality may be recognized by a user of the display device 100, and thus the magnitude of the bias current I_bias may be sequentially changed. For example, the magnitude of the bias current I_bias may be sequentially decreased or may be sequentially increased.

According to an embodiment, the magnitude of the bias current I_bias of the regulator 152 may be differently controlled according to an environment in which the display device 100 is driven. For example, the magnitude of the bias current I_bias of the regulator 152 may be differently controlled according to the temperature around the display device 100 or the luminance of the image displayed on the display device 100.

In an embodiment, the magnitude of the bias current I_bias of the regulator 152 in the blank period BP may be controlled to be relatively less under a room temperature condition (for example, about 25° C.), and may be controlled to be relatively high under a harsh condition (for example, a high temperature condition and/or a low temperature condition).

In an embodiment, the magnitude of the bias current I_bias of the regulator 152 in the blank period BP may be controlled to be relatively less under a low luminance condition and may be controlled to be relatively high under a high luminance condition.

Through this, the embodiments of the disclosure may adaptively control a current consumed by the regulator 152 according to a circumstance within a range in which the display quality of the display device 100 is not deteriorated, thereby reducing power consumption of the display device 100 (for example, the regulator 152).

Figure 22:
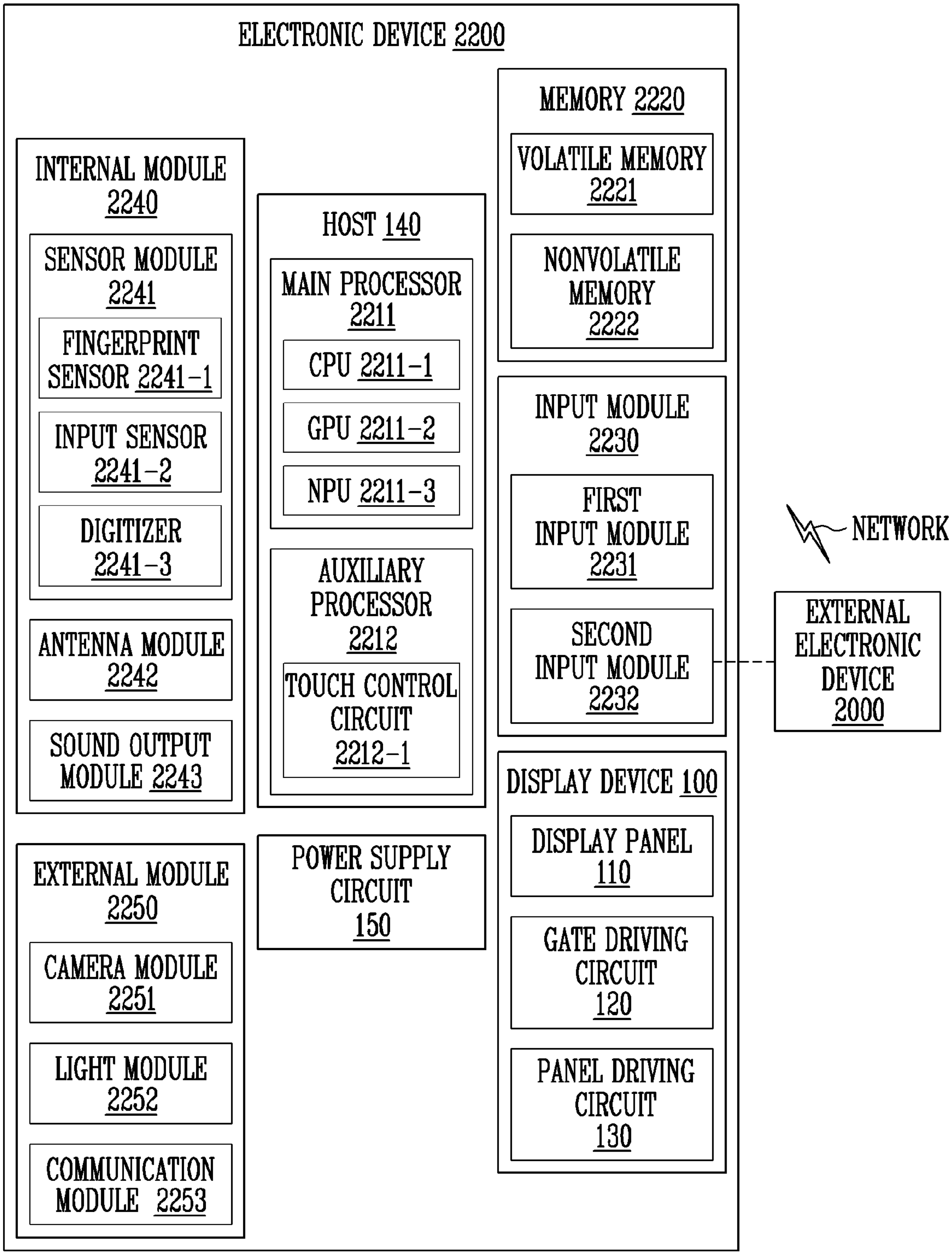
FIG. 22 is a system block diagram of an electronic device according to embodiments of the disclosure.

FIG. 22 is a system block diagram of an electronic device according to embodiments of the disclosure.

Referring to FIG. 22, the electronic device 2200 according to embodiments of the disclosure may output various pieces of information through the display device 100. When the host 140 executes an application stored in a memory 2220, the display device 100 may provide application information to a user through the display panel 110.

The host 140 may obtain an external input through an input module 2230, a sensor module 2241, or the like and execute an application corresponding to the external input. For example, when the user of the electronic device 2200 selects a camera icon (or a camera application) displayed on the display panel 110, the host 140 may obtain a user input through an input sensor 2241-2 and activate a camera module 2251. The host 140 may transfer image data corresponding to a captured image obtained through the camera module 2251 to the display device 100. The display device 100 may display an image corresponding to the captured image through the display panel 110.

As another example, when personal information authentication is executed in the display device 100, a fingerprint sensor 2241-1 may obtain input fingerprint information as input data. The host 140 may compare the input data obtained through the fingerprint sensor 2241-1 with authentication data pre-stored in the memory 2220 and execute an application according to a comparison result. The display device 100 may display information executed according to a logic of the application through the display panel 110. The fingerprint sensor 2241-1 may be disposed to obtain the fingerprint information from at least a partial area of the entire area of the display device 100 (or the display panel 110).

As still another example, when a music streaming icon displayed on the display device 100 is selected, the host 140 may obtain a user input through the input sensor 2241-2 and activate a music streaming application stored in the memory 2220. When a music execution command is input in the music streaming application, the host 140 may activate a sound output module 2243 to provide sound information corresponding to the music execution command to the user of the electronic device 2200.

In the above, an operation of the electronic device 2200 is briefly described. Hereinafter, a configuration of the electronic device 2200 is described in detail. Some of configurations of the electronic device 2200 to be described later may be integrated and provided as one configuration, and one configuration may be separated into two or more configurations and provided.

The electronic device 2200 may communicate with an external electronic device 2000 through a network (for example, a short-range wireless communication network or a long-range wireless communication network). According to an embodiment, the electronic device 2200 may include the host 140, the memory 2220, the input module 2230, the display device 100, a power supply circuit 150, an internal module 2240, an external module 2250, and the like. According to an embodiment, in the electronic device 2200, at least one of the above-described components may be omitted or one or more other components may be added. According to an embodiment, some of the above-described components (for example, the sensor module 2241, an antenna module 2242, or the sound output module 2243) may be integrated into another component (for example, the display device 100).

The host 140 may execute software to control at least another component (for example, a hardware or software component) of the electronic device 2200 connected to the host 140, and perform various data processing or operations. According to an embodiment, as at least a portion of the data processing or operation, the host 140 may store a command or data received from another component (for example, the input module 2230, the sensor module 2241, a communication module 2253, or the like) in a volatile memory 2221 and process the command or the data stored in the volatile memory 2221, and store result data obtained by processing in a nonvolatile memory 2222.

The host 140 may include a main processor 2211 and an auxiliary processor 2212. The main processor 2211 may include one or more of a central processing unit (CPU) 2211-1 or an application processor (AP). The main processor 2211 may further include any one of a graphic processing unit (GPU) 2211-2, a communication processor (CP), and an image signal processor (ISP). The main processor 2211 may further include a neural processing unit (NPU) 2211-3. The NPU 2211-3 is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 2212 may further include a touch control circuit 2212-1. The touch control circuit 2212-1 may supply a touch signal to the input sensor 2241-2 and receive a sensing signal from the input sensor 2241-2 in response to the touch signal.

The memory 2220 may store various data used by at least one component (for example, the host 140 or the sensor module 2241) of the electronic device 2200, and input data or output data for a command related thereto. In addition, various setting data corresponding to a setting of the user may be stored in the memory 2220. The memory 2220 may include at least one of the volatile memory 2221 and the nonvolatile memory 2222.

The input module 2230 may receive a command or data to be used by a component (for example, the host 140, the sensor module 2241, or the sound output module 2243) of the electronic device 2200 from an exterior source (for example, the user or the external electronic device 2000) of the electronic device 2200.

The input module 2230 may include a first input module 2231 to which a command or data is input from the user and a second input module 2232 to which a command or data is input from the external electronic device 2000. The first input module 2231 may include a microphone, a mouse, a keyboard, a key (for example, a button), or a pen (for example, a passive pen or an active pen). The second input module 2232 may support a designated protocol capable of connecting to the external electronic device 2000 by wire or wirelessly. According to an embodiment, the second input module 2232 may include, for example, a high definition multimedia interface (HDMI), a universal serial bus (USB) interface, an secure digital (SD) card interface, or an audio interface. The second input module 2232 may include a connector capable of physically connecting to the external electronic device 2000, an HDMI connector, a USB connector, an SD card connector, an audio connector (for example, a headphone connector), or the like.

The display device 100 may visually provide information to the user of the electronic device 2200. The display device 100 may include the display panel 110, the gate driving circuit 120, the panel driving circuit 130, and the like. The display device 100 may further include mechanical components such as a window, a chassis, and a bracket for protecting the display panel 110.

The display panel 110 may be implemented as a liquid crystal display panel, an organic light emitting display panel, an inorganic light emitting display panel, or the like, and a type of the display panel 110 is not particularly limited. The display panel 110 may be a rigid type or a flexible type that may be rolled or folded. The display device 110 may further include a supporter, a bracket, or the like supporting the display panel 110. The display device 100 may further include a heat dissipation member and the like.

The gate driving circuit 120 may be mounted on the display panel 110 as a driving chip. According to an embodiment, the gate driving circuit 120 may be formed internally in the display panel 110. For example, the gate driving circuit 120 may be implemented as an amorphous silicon thin film transistor (TFT) gate driver circuit (ASG), a low temperature polycrystalline silicon TFT gate driver circuit (LTPSG), an oxide semiconductor TFT gate driver circuit (OSG), or the like built in the display panel 110. The gate driving circuit 120 may receive a control signal (for example, a scan driving circuit control signal, a light emitting driving circuit control signal, and the like) from the host 140 and output the gate signals to the display panel 110 in response to the control signal.

The panel driving circuit 130 may include the data driver 132, the timing controller 134, and the power generator 136 described above with reference to FIG. 1.

The power supply circuit 150 may supply power to a component of the electronic device 2200. The power supply circuit 150 may include a battery that charges a power voltage. The battery may include a non-rechargeable primary cell, a rechargeable secondary cell or fuel cell, or the like. The power supply circuit 150 may include a power management integrated circuit (PMIC). The PMIC may supply optimized power to each of the above-described configurations and configurations to be described later. The power supply circuit 150 may include a wireless power transmission/reception member to the battery. The wireless power transmission/reception member may include a plurality of antenna radiators of a coil form.

The electronic device 2200 may include the internal module 2240 and the external module 2250. The internal module 2240 may include the sensor module 2241, the antenna module 2242, the sound output module 2243, and the like. The external module 2250 may include the camera module 2251, a light module 2252, the communication module 2253, and the like.

The sensor module 2241 may sense an input by a body of the user or an input by a pen among the first input module 2231, and may generate an electrical signal or a data value corresponding to the input. The sensor module 2241 may include at least one of the fingerprint sensor 2241-1, the input sensor 2241-2, and a digitizer 2241-3.

The fingerprint sensor 2241-1 may generate a data value corresponding to a fingerprint of the user. The fingerprint sensor 2241-1 may include any one of an optical type fingerprint sensor or a capacitive type fingerprint sensor.

The input sensor 2241-2 may generate a data value corresponding to coordinate information of the input by the body of the user or the pen. The input sensor 2241-2 may generate a capacitance change amount by the input as the data value. The input sensor 2241-2 may sense an input by the passive pen or may transmit/receive data to and from the active pen.

The input sensor 2241-2 may measure a biometric signal such as blood pressure, water, or body fat. For example, when the user of the electronic device 2200 touches a sensor layer or a sensing panel with a body part and does not move during a certain time, the input sensor 2241-2 may sense the biometric signal based on a change of an electric field or the like by the body part and output information desired by the user to the display device 100.

The digitizer 2241-3 may generate a data value corresponding to coordinate information input by a pen. The digitizer 2241-3 may generate an electromagnetic change amount by an input as the data value. The digitizer 2241-3 may sense an input by a passive pen or transmit or receive data to or from the active pen.

At least one of the fingerprint sensor 2241-1, the input sensor 2241-2, and the digitizer 2241-3 may be implemented as a sensor layer formed on the display panel 110 through a successive process. At least one of the fingerprint sensor 2241-1, the input sensor 2241-2, and the digitizer 2241-3 may be disposed on one side of the display panel 110 (for example, on the display panel 110), and any one of the fingerprint sensor 2241-1, the input sensor 2241-2, and the digitizer 2241-3, for example, the digitizer 2241-3 may be disposed on another side of the display panel 110 (for example, under the display panel 110).

At least two of the fingerprint sensor 2241-1, the input sensor 2241-2, and the digitizer 2241-3 may be formed to be integrated into one sensing panel through the same process. When at least two of the fingerprint sensor 2241-1, the input sensor 2241-2, and the digitizer 2241-3 are integrated into one sensing panel, the sensing panel may be disposed between the display panel 110 and the window disposed above the display panel 110. According to an embodiment, the sensing panel may be disposed on the window. A position of the sensing panel is not particularly limited.

At least one of the fingerprint sensor 2241-1, the input sensor 2241-2, and the digitizer 2241-3 may be embedded in the display panel 110. That is, at least one of the fingerprint sensor 2241-1, the input sensor 2241-2, and the digitizer 2241-3 may be simultaneously formed through a process of forming the elements (for example, the light emitting element, the transistor, and the like) included in the display panel 110.

The sensor module 2241 may further generate an electrical signal or a data value corresponding to an internal state or an external state of the electronic device 2200. The sensor module 2241 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, or the like.

The antenna module 2242 may include one or more antennas for transmitting and/or receiving a signal to/from free space. According to an embodiment, the communication module 2253 may transmit a signal to an external electronic device or receive a signal from an external electronic device through an antenna suitable for a communication method. An antenna pattern of the antenna module 2242 may be integrated into one configuration (for example, the display panel 110) of the display device 100 or the input sensor 2241-2.

The sound output module 2243 is a device for outputting a sound signal to the exterior of the electronic device 2200, and may include, for example, a speaker used for general purposes such as multimedia playback or recording playback, a receiver used exclusively for receiving a call, and the like. According to an embodiment, the receiver may be formed integrally with or separately from the speaker. A sound output pattern of the sound output module 2243 may be integrated into the display device 100.

The camera module 2251 may capture a still image (for example, a photograph) and a moving image. According to an embodiment, the camera module 2251 may include one or more lenses, an image sensor, an image signal processor, or the like. The camera module 2251 may further include an infrared camera capable of measuring presence or absence of the user, a user's position, a user's gaze, and the like.

The light module 2252 may provide light. The light module 2252 may include a light emitting diode or a xenon lamp. The light module 2252 may operate in conjunction with the camera module 2251 or may operate independently.

The communication module 2253 may support establishment of a wired or wireless communication channel between the electronic device 2200 and the external electronic device 2000 and communication performance through the established communication channel. The communication module 2253 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 2253 may communicate with the external electronic device 2000 through a short-range communication network such as Bluetooth, Wireless fidelity (WiFi) direct, or infrared data association (IrDA), or a long-range communication network such as a cellular network, the Internet, or a computer network (for example, LAN or wide area network (WAN)). The above-described various types of communication modules 2253 may be implemented as a single chip or as separate chips.

The input module 2230, the sensor module 2241, the camera module 2251, and the like may be used to control an operation of the display device 100 in conjunction with the host 140.

The host 140 may output a command or data to the display device 100, the sound output module 2243, the camera module 2251, or the light module 2252 based on input data received from the input module 2230. For example, the host 140 may generate image data in response to the input data input through a mouse, an active pen, or the like and output the image data to the display device 100, or generate command data in response to the input data and output the command data to the camera module 2251, the light module 2252, or the like. When the input data is not received from the input module 2230, the host 140 may convert an operation mode of the electronic device 2200 to a low power mode or a sleep mode to reduce power consumed in the electronic device 2200. The display device 100 may operate in the AOD mode in the sleep mode.

The host 140 may output a command or data to the display device 100, the sound output module 2243, the camera module 2251, or the light module 2252 based on sensing data received from the sensor module 2241. For example, the host 140 may compare authentication data input by the fingerprint sensor 2241-1 with authentication data pre-stored in the memory 2220 and then execute an application according to a comparison result. The host 140 may execute the command based on sensing data sensed by the input sensor 2241-2 or the digitizer 2241-3, or output corresponding image data to the display device 100. In an embodiment in which the sensor module 2241 includes a temperature sensor, the host 140 may receive temperature data TD (refer to FIG. 19) for a measured temperature from the sensor module 2241 and further perform luminance correction or the like on the image data based on the received temperature data TD.

The host 140 may receive measurement data for presence or absence of the user, a position of the user, a gaze of the user, and the like, from the camera module 2251. The host 140 may further perform luminance correction or the like on the image data based on the measurement data. For example, further referring to FIG. 19, when it is determined that the user exists, the host 140 may control the timing controller 134 to output the regulator control signal LCS having a relatively high digital signal value by outputting the condition signal CDS. When it is determined that the user does not exist, the host 140 may control the timing controller 134 to output the regulator control signal LCS having a relatively less digital signal value by outputting the condition signal CDS.

Some of the above-described components may be connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The host 140 may communicate with the display device 100 through a mutually agreed interface, for example, may use any one of the above-described communication methods, and is not limited to the above-described communication method.

The regulator, the display device including the same, the electronic device including the same, and the method of driving the same may operate at reduced power consumption relative to conventional devices and methods.

Although the inventive concept has been described with reference to the embodiments thereof, those skilled in the art will understand that the disclosure may be variously modified and changed without departing from the spirit and scope of the inventive concept as set forth in the following claims.

The drawings referred to and the detailed description of the disclosure described herein are merely examples of the disclosure, are used for merely describing the disclosure, and are not intended to limit the meaning and the scope of the disclosure in accordance with the claims. Therefore, those skilled in the art will understand that various modifications and equivalent other embodiments are possible from these. Thus, the true scope of the disclosure should be determined by the technical spirit of the appended claims.

What is claimed is:

1. A regulator comprising:

a bias current generation circuit comprising a first input terminal and a second input terminal and configured to generate a bias current in response to at least one of a voltage applied to the first input terminal and a voltage applied to the second input terminal;

a current source circuit, electrically connected to an output of the bias current generation circuit, including a plurality of current sources connected in parallel and configured to control a magnitude of the bias current, wherein the bias current is commonly input to the plurality of current sources.

2. The regulator of claim 1, further comprising:

an operational amplifier including the bias current generation circuit, wherein the bias current generation circuit further comprises:

a driving terminal to which regulator driving power is applied;

a first operational amplifier transistor electrically connected to the driving terminal and generating at least a portion of the bias current in response to the voltage applied to the first input terminal; and a second operational amplifier transistor electrically connected to the driving terminal and generating a remaining portion of the bias current in response to the voltage applied to the second input terminal.

3. The regulator of claim 2, wherein the current source circuit further comprises a plurality of switching elements configured to control an operation of each of the plurality of current sources, and each of the plurality of current sources is electrically connected to the first operational amplifier transistor and the second operational amplifier transistor.

4. The regulator of claim 3, wherein the plurality of switching elements are controlled in response to a regulator control signal.

5. The regulator of claim 1, wherein at least two of the plurality of current sources have different current driving capabilities.

6. The regulator of claim 1, wherein all of the plurality of current sources have the same current driving capability.

7. The regulator of claim 2, wherein the second input terminal is electrically connected to a feedback node, and the regulator further comprises:

a control transistor controlled in response to a voltage of an output terminal of the operational amplifier and configured to provide an electrical connection between the driving terminal and an output node;

a first feedback resistor connected between the control transistor and the feedback node;

a second feedback resistor connected between the first feedback resistor and a ground terminal; and an output capacitor including one electrode connected to the output node and another electrode connected to the ground terminal.

8. A display device comprising:

a display panel including a plurality of sub-pixels, a plurality of scan lines electrically connected to the plurality of sub-pixels, a plurality of data lines electrically connected to the plurality of sub-pixels, and a plurality of power lines electrically connected to the plurality of sub-pixels;

a gate driving circuit including a scan driver configured to supply a scan signal to the plurality of scan lines; and a panel driving circuit including a data driver configured to supply a data signal to the plurality of data lines, a timing controller configured to control a driving timing of the data driver and the gate driving circuit, and a power generator configured to generate a plurality of target voltages, wherein the power generator includes a plurality of regulators, each configured to generate a respective one of the plurality of target voltages, each of the target voltages being supplied to the display panel, the gate driving circuit, or the data driver, the timing controller supplies a regulator control signal for controlling the power generator, and a bias current of at least one of the plurality of regulators is adjusted according to the regulator control signal.

9. The display device of claim 8, wherein:

each of the plurality of sub-pixels includes a pixel circuit, the pixel circuit being connected to a corresponding one of the plurality of data lines, the display panel displays an image during a plurality of frame periods, and at least one of the plurality of frame periods comprises:

an active period in which the data signal is supplied to the pixel circuit of each of the plurality of sub-pixels; and a blank period in which at least one transistor of the pixel circuit maintains a turn-off state in the pixel circuit of each of the plurality of sub-pixels.

10. The display device of claim 9, wherein the timing controller supplies a different regulator control signal in the active period than in the blank period.

11. The display device of claim 9, wherein a magnitude of the bias current of the at least one regulator in the active period is greater than a magnitude of the bias current of the at least one regulator in the blank period.

12. The display device of claim 9, wherein a current amount of the bias current sequentially changes when operation of the display device is changed from the active period to the blank period or from the blank period to the active period.

13. The display device of claim 9, wherein the power generator includes a resistance string configured to generate a plurality of input voltages, and one of the plurality of input voltages is input to each of the plurality of regulators, respectively.

14. An electronic device comprising:

a host configured to transmit input image data;

a power supply circuit configured to supply regulator driving power; and a display device comprising a display panel including a plurality of sub-pixels, a data driver configured to supply a data signal to the plurality of sub-pixels, a gate driving circuit configured to supply a gate signal to the plurality of sub-pixels, a regulator configured to generate a constant voltage derived from the regulator driving power, and a timing controller for controlling the regulator, the data driver, and the gate driving circuit, wherein the timing controller controls the data driver to output the data signal corresponding to the received input image data to the display panel in an active period of one frame period, and controls the gate driving circuit so that the plurality of sub-pixels emit light based on the data signal supplied during the active period in a blank period of the one frame period, and the timing controller outputs a regulator control signal for variably controlling a magnitude of a bias current of the regulator.

15. The electronic device of claim 14, wherein the host transmits information on a driving frequency, the timing controller generates a vertical synchronization signal and a data enable signal based on the transmitted information on the driving frequency as received by the host, the vertical synchronization signal defines a length of one frame period, and the data enable signal defines the active period and the blank period in the one frame period.

16. The electronic device of claim 14, wherein the host outputs input image data to the display device, the display device displays an image corresponding to the input image data, the host receives temperature data and outputs a condition signal including temperature information of the temperature data and luminance information of the input image data, and the timing controller outputs the regulator control signal corresponding to the temperature information and the luminance information.

17. The electronic device of claim 16, wherein the timing controller includes a memory, and the timing controller outputs a digital signal value corresponding to the temperature information and the luminance information as the regulator control signal with reference to the memory.

18. The electronic device of claim 17, wherein the timing controller controls the magnitude of the bias current to be increased when a luminance increases based on the luminance information.

19. The electronic device of claim 14, wherein the display panel includes a plurality of scan lines electrically connected to the plurality of sub-pixels and to which the gate signal is applied, a plurality of data lines electrically connected to the plurality of sub-pixels and to which the data signal is applied, and a plurality of power lines electrically connected to the plurality of sub-pixels, at least one of the plurality of sub-pixels comprises:

a first transistor connected between a first node and a second node and including a gate electrode connected to a third node;

a second transistor configured to switch an electrical connection between a corresponding one of the plurality of data lines and the first node;

a third transistor configured to switch an electrical connection between the second node and the third node; and a fourth transistor configured to switch an electrical connection between a power line to which a first initialization voltage is applied among the plurality of power lines and the third node, and at least one of the third transistor and the fourth transistor includes an oxide semiconductor.

20. A method of driving an electronic device comprising a host configured to output input image data and a control signal, a display device configured to display an image corresponding to the input image data based on the control signal, and a power supply circuit configured to supply regulator driving power to the display device, the method comprising:

outputting, by the host, a vertical synchronization signal defining one frame period and a data enable signal defining an active period and a blank period in the one frame period;

outputting, by a timing controller of the display device, different respective regulator control signals in the active period and the blank period in response to the vertical synchronization signal and the data enable signal; and generating, by a regulator of the display device configured to generate a constant voltage, a bias current of different respective magnitudes in the active period and the blank period in response to the regulator control signal.

* * * * *